United States Patent
Doy

(10) Patent No.: US 12,065,788 B2
(45) Date of Patent: Aug. 20, 2024

(54) SYSTEM AND METHOD FOR MARKING A BOUNDARY WHILE DEFINING AN AUTONOMOUS WORKSITE

(71) Applicant: Caterpillar Paving Products Inc., Brooklyn Park, MN (US)

(72) Inventor: Nathaniel S Doy, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 474 days.

(21) Appl. No.: 17/356,119

(22) Filed: Jun. 23, 2021

(65) Prior Publication Data

US 2022/0412018 A1 Dec. 29, 2022

(51) Int. Cl.
*E01C 19/00* (2006.01)
*E01C 19/23* (2006.01)
*G05D 1/00* (2006.01)

(52) U.S. Cl.
CPC ............ *E01C 19/004* (2013.01); *E01C 19/23* (2013.01); *G05D 1/0214* (2013.01); *G05D 1/0246* (2013.01); *G05D 1/0278* (2013.01)

(58) Field of Classification Search
CPC ..... E01C 19/004; E01C 19/23; G05D 1/0214; G05D 1/0246; G05D 1/0278; G05D 2201/0202
See application file for complete search history.

(56) References Cited

U.S. PATENT DOCUMENTS

| | | | |
|---|---|---|---|
| 5,050,771 A * | 9/1991 | Hanson | A01B 79/005 222/1 |
| 6,112,143 A | 8/2000 | Allen et al. | |
| 9,291,709 B2 | 3/2016 | Mitsuta et al. | |
| 2014/0032058 A1* | 1/2014 | Stratton | E02F 9/261 701/50 |
| 2020/0103906 A1* | 4/2020 | O'Donnell | E01C 19/004 |
| 2020/0356088 A1* | 11/2020 | Schlacks, IV | G05D 1/0219 |
| 2021/0405644 A1* | 12/2021 | Berridge | A01B 69/008 |
| 2022/0022361 A1* | 1/2022 | Ogura | G05D 1/0219 |
| 2022/0366798 A1* | 11/2022 | Dill | G08G 5/0021 |

(Continued)

FOREIGN PATENT DOCUMENTS

DE 102014006477 A1 11/2015
JP 2009121053 A 6/2009

(Continued)

*Primary Examiner* — Frederick M Brushaber
*Assistant Examiner* — Harrison Heflin

(57) ABSTRACT

A system and method for marking a boundary while defining an autonomous worksite includes receiving first information indicative of a first maneuvering distance from a side of a machine and activating an indicator. The indicator, representative of the first maneuvering distance, is positioned at the side of the machine to be visible to an operator of the machine. The machine is positioned on a worksite surface along a path to be traversed when executing a work plan. After a control system receives a verification from the operator that the machine may operate outside the worksite area and within an outer boundary defined by the first maneuvering distance, a worksite perimeter is defined to include the path, and a geofence for the machine is determined to substantially overlay the outer boundary.

16 Claims, 9 Drawing Sheets

(56) References Cited

U.S. PATENT DOCUMENTS

| | | | | |
|---|---|---|---|---|
| 2022/0374020 A1* | 11/2022 | Tahiliani | ............ | G01C 21/3461 |
| 2023/0081284 A1* | 3/2023 | Nishii | ................. | A01B 69/008 |
| | | | | 701/25 |

FOREIGN PATENT DOCUMENTS

| | | | |
|---|---|---|---|
| WO | 2020217972 A1 | 10/2020 | |
| WO | WO2020-206426 A1 | 10/2020 | |

* cited by examiner

SYSTEM AND METHOD FOR MARKING A BOUNDARY WHILE DEFINING AN AUTONOMOUS WORKSITE

TECHNICAL FIELD

The present disclosure relates to a control system and method for a compaction machine. More specifically, the present disclosure relates to a control system and method for defining a perimeter of a worksite to be compacted and a boundary outside the perimeter within which a compaction machine may maneuver.

BACKGROUND

Compaction machines are frequently employed for compacting soil, gravel, fresh laid asphalt, and other compactable materials associated with worksite surfaces. For example, during construction of roadways, highways, parking lots and the like, one or more compaction machines are typically utilized to compact soil, stone, and/or recently laid asphalt. Such compaction machines, which may be self-propelling machines, travel over the worksite surface whereby the weight of the compaction machine compresses the surface materials to a solidified mass. In some examples, loose asphalt is deposited and spread over the worksite surface, and one or more additional compaction machines travel over the loose asphalt to produce a densified, rigid asphalt mat. The rigid, compacted asphalt has the strength to accommodate significant vehicular traffic and, in addition, provides a smooth, contoured surface capable of directing rain and other precipitation from the compacted surface.

To assist with the compaction process and to improve compaction quality, a compaction machine may be equipped to operate in an autonomous or semi-autonomous mode in which the machine operates at least in part under computer control. In preparation for computer control, the compaction machine obtains geographical coordinates of its position, and an operator uses the machine to mark a perimeter of a worksite, typically as a polygon. The machine then develops a work plan including paths for traversing the surface of a compaction area. The machine assumes that terrain outside the perimeter may be dangerous for the operator or unsuitable for compaction. To avoid inadvertent movement outside the perimeter, the work plan will reduce the size of the compaction area and add a buffer zone between the compaction area and the perimeter where the machine may maneuver. While the buffer zone helps ensure safety, the resulting worksite area inside the buffer zone is smaller than the perimeter that was defined, making the area to be compacted less than sought by the operator.

One method for defining a boundary for a compaction machine is described in Int'l Patent Pub. No. WO 2020/206426 ("the '426 reference"). The '426 reference describes a system for autonomous or semi-autonomous operation of a compaction vehicle that uses machine automation portal (MAP) application to display a map of a worksite. A graphical user interface enables a user to define on the map a boundary of an autonomous operating zone and a boundary of one or more exclusion zones where the vehicle may not travel. However, the system described in the '426 reference requires aerial satellite photography or drone imagery to generate the map and the time and training of an operator to manipulate the MAP application to record a work area and separately to record exclusion zones. In addition, software of the system in the '426 reference must validate that the vehicle would have enough space for maneuvering to complete the compaction within the selected boundaries. As a result, the system described in the '426 reference is complex, expensive, and time-consuming for operators in most circumstances.

Examples of the present disclosure are directed to overcoming deficiencies of such systems.

SUMMARY

In an aspect of the present disclosure, a method includes receiving first information indicative of a first maneuvering distance from a side of a machine and activating an indicator, visible to an operator of the machine. In an example, the indicator is representative of the first maneuvering distance at the side of the machine. The method further includes causing the machine to be positioned on a worksite area along a path to be traversed by the machine when executing a work plan, where the indicator is positioned outside the worksite area. The machine then receives a verification from an operator of the machine, based at least in part on the indicator, that the machine may operate outside the worksite area and within an outer boundary defined at least in part by the first maneuvering distance. After receiving the verification, at least a portion of a perimeter of the worksite for the work plan is defined to include the path. As well, at least a portion of a geofence for the machine is determined that substantially overlays the outer boundary.

In another aspect of the present disclosure, a control system includes a location sensor configured to determine a location of a compaction machine on a worksite surface, a control interface connected to the compaction machine, and a controller in communication with the location sensor and the control interface. In such an example, the controller is configured to cause one or more markers to be visually displayed indicating a boundary beyond one or more sides of the compaction machine while the compaction machine is positioned at an edge of a worksite area to be compacted. Moreover, the controller is configured to receive, from the location sensor, information regarding the location of the compaction machine. Through a control interface, the controller receives a verification that the compaction machine may maneuver outside the worksite area and within the boundary based on inspection of a ground zone between the one or more sides of the compaction machine and the one or more markers. The control system is additionally configured to determine a perimeter of the worksite area for a work plan, where the perimeter corresponds at least in part to the location of the compaction machine. As well, the control system is configured to generate a geofence for the workplan that substantially overlays the boundary.

In yet another aspect of the present disclosure, a compaction machine includes a substantially cylindrical drum configured to compact a worksite surface as the compaction machine traverses the worksite surface, a location sensor configured to determine a location of the compaction machine on the worksite surface, a control interface, and a controller in communication with the location sensor and the control interface. In such an example, the controller is configured to cause one or more markers to be visually displayed indicating a boundary beyond one or more sides of the compaction machine while the compaction machine travels along a perimeter of a polygonal area to be compacted and to receive, from the location sensor, information regarding locations of the compaction machine. The controller is additionally configured to identify, based at least in part on the locations of the compaction machine, the perimeter of the polygonal area. Via a control interface, the controller receives a verification that the compaction machine may maneuver outside the worksite area and within the boundary based on inspection of a ground zone between the one or more sides of the compaction machine and the one or more markers. Further, a geofence is established for the compaction machine that includes positional coordinates substantially coinciding with the boundary.

DETAILED DESCRIPTION

Figure 1:
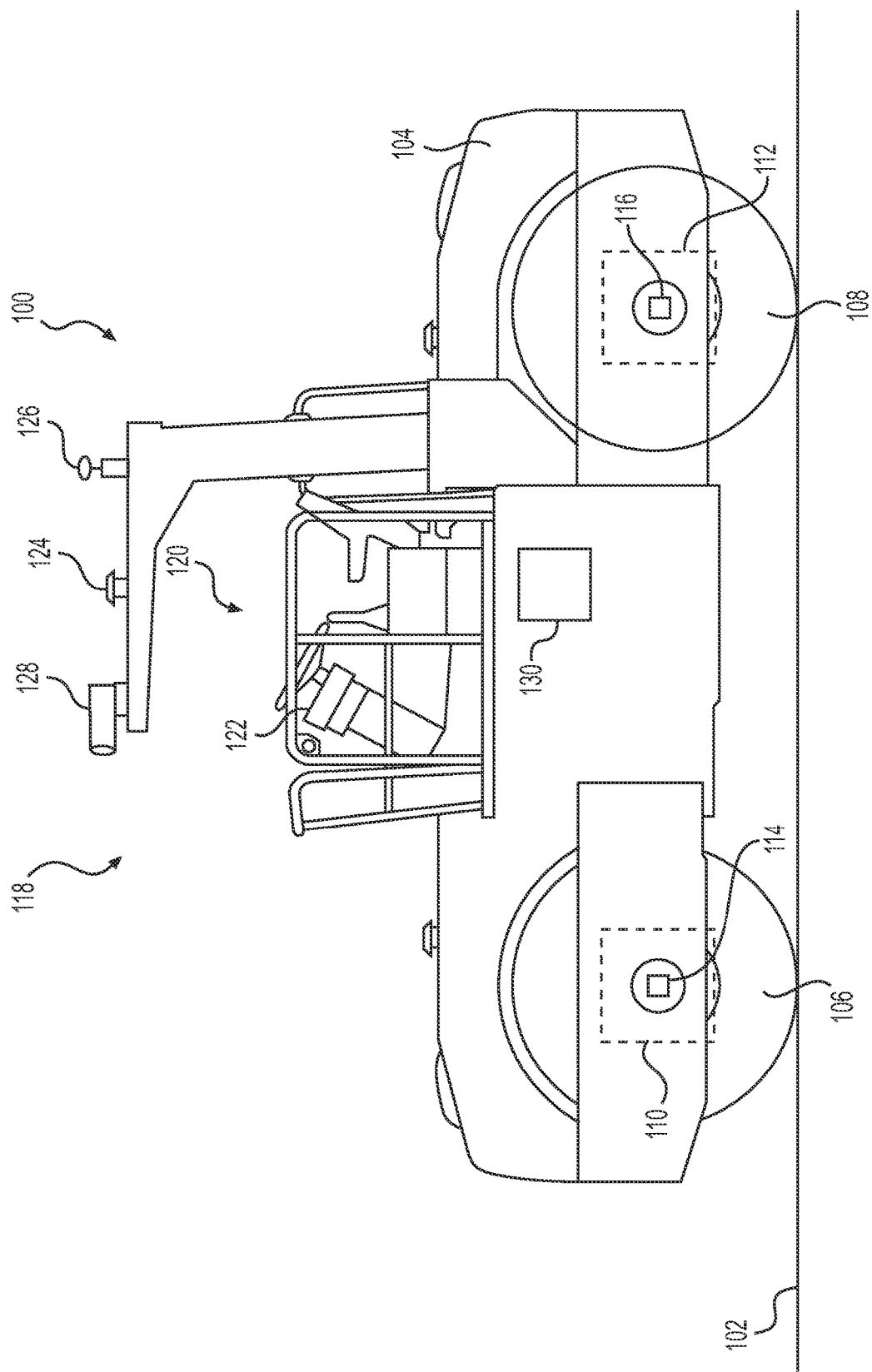
FIG. 1 is a side view of a compaction machine in accordance with an example of the present disclosure.

Wherever possible, the same reference numbers will be used throughout the drawings to refer to same or like parts. FIG. 1 shows an example compaction machine 100. Compaction machine 100 may be configured for use in, for example, road construction, highway construction, parking lot construction, and other such paving and/or construction applications. For example, such a compaction machine 100 may be used in situations where it is necessary to compress loose stone, gravel, soil, sand, concrete, and/or other materials of a worksite surface 102 to a state of greater compaction and/or density. As compaction machine 100 traverses the worksite surface 102, vibrational forces generated by compaction machine 100 and imparted to the worksite surface 102, acting in cooperation with the weight of compaction machine 100, compresses the loose materials. Compaction machine 100 typically makes one or more passes over the worksite surface 102 to provide a desired level of compaction. Although described above as being configured to compact primarily earth-based materials of the worksite surface 102, in other examples, compaction machine 100 may also be configured to compact freshly deposited asphalt or other materials disposed on and/or associated with the worksite surface 102.

As shown in FIG. 1, an example compaction machine 100 includes a frame 104, a first drum 106, and a second drum 108. The first and second drums 106, 108 comprise substantially cylindrical drums and/or other compaction elements of compaction machine 100, and the first and second drums 106, 108 are configured to apply vibration and/or other forces to the worksite surface 102 in order to assist in compacting the worksite surface 102. Although illustrated in FIG. 1 as having a substantially smooth circumference or outer surface, in other examples, the first drum 106 and/or the second drum 108 may include one or more teeth, pegs, extensions, bosses, pads, and/or other ground-engaging tools (not shown) extending from the outer surface thereof. Such ground-engaging tools assist in breaking-up at least some of the materials associated with the worksite surface 102 and/or otherwise assist in compacting the worksite surface 102. The first drum 106 and the second drum 108 are rotatably coupled to the frame 104 so that the first drum 106 and the second drum 108 roll over the worksite surface 102 as compaction machine 100 travels.

The first drum 106 may have the same or different construction as the second drum 108. In some examples, the first drum 106 and/or the second drum 108 is an elongated, hollow cylinder with a cylindrical drum shell that encloses an interior volume. The first drum 106 defines a first central axis about which the first drum 106 rotates, and similarly, the second drum 108 defines a second central axis about which the second drum 108 rotates. In order to withstand being in rolling contact with and compacting the loose material of the worksite surface 102, the respective drum shells of the first drum 106 and the second drum 108 are typically made from a thick, rigid material such as cast iron or steel. Compaction machine 100 is shown as having first and second drums 106, 108. However, other types of compaction machines 100 may be suitable for use in the context of the present disclosure. For example, belted compaction machines or compaction machines having a single rotating drum, or more than two drums, are contemplated herein. Rather than a self-propelled compaction machine 100 as shown, compaction machine 100 might be a tow-behind or pushed unit configured to couple with a tractor (not shown). An autonomous compaction machine 100 is also contemplated herein.

The first drum 106 includes a first vibratory mechanism 110, and the second drum 108 includes a second vibratory mechanism 112. While FIG. 1 shows first drum 106 having a first vibratory mechanism 110 and second drum 108 having a second vibratory mechanism 112, in other examples only one of the first and second drums 106, 108 may include a respective vibratory mechanism 110, 112. Such vibratory mechanisms 110, 112 may be disposed inside the interior volume of first and second drums 106, 108, respectively.

According to an example, vibratory mechanisms 110, 112 may include one or more weights or masses disposed at a position off-center from the respective central axis around which the first and second drums 106, 108 rotate. As first and second drums 106, 108 rotate, the off-center or eccentric positions of the masses induce oscillatory or vibrational forces to the first and second drums 106, 108, and such forces are imparted to the worksite surface 102. The weights are eccentrically positioned with respect to the respective central axis around which first and second drums 106, 108 rotate, and such weights are typically movable with respect to each other (e.g., about the respective central axis) to produce varying degrees of imbalance during rotation of first and second drums 106, 108. The amplitude of the vibrations produced by such an arrangement of eccentric rotating weights may be varied by modifying and/or otherwise controlling the position of the eccentric weights with respect to each other, thereby varying the average distribution of mass (i.e., the centroid) with respect to the axis of rotation of the weights. The present disclosure is not limited to these examples described above.

According to an example, a sensor 114 is located on the first drum 106 and/or a sensor 116 is located on the second drum 108. In alternative examples, multiple sensors 114, 116 are located on first drum 106, second drum 108, frame 104, and/or other components of compaction machine 100. In such examples, sensors 114, 116 are compaction sensors configured to measure, sense, and/or otherwise determine the density, stiffness, compaction, compactability, and/or other characteristics of worksite surface 102. Such characteristics of worksite surface 102 are based on the composition, dryness, and/or other characteristics of the material being compacted. Such characteristics of the worksite surface 102 may also be based on the operation and/or characteristics of first drum 106 and/or the second drum 108. For example, sensor 114 coupled to first drum 106 may be configured to sense, measure, and/or otherwise determine the type of material, material density, material stiffness, and/or other characteristics of worksite surface 102 proximate the first drum 106. Additionally, sensor 114 coupled to the first drum 106 may measure, sense, and/or otherwise determine operating characteristics of first drum 106 including a vibration amplitude, a vibration frequency, a speed of the eccentric weights associated with first drum 106, a distance of such eccentric weights from the axis of rotation, a speed of rotation of the first drum 106, etc. It is not necessary to measure all of the operating characteristics of the first drum 106 or second drum 108 listed herein, instead, the above characteristics are listed for exemplary purposes.

With continued reference to FIG. 1, exemplary compaction machine 100 also includes an operator station 118. The operator station 118 includes a steering system 120 including a steering wheel, levers, and/or other controls (not shown) for steering and/or otherwise operating compaction machine 100. In such examples, the various components of the steering system 120 are connected to one or more actuators, a throttle of compaction machine 100, an engine of the compaction machine, a braking assembly, and/or other such compaction machine components, and steering system 120 is used by an operator of compaction machine 100 to adjust a speed, travel direction, and/or other aspects of compaction machine 100 during use. The operator station 118 also includes a control interface 122 for controlling various functions of compaction machine 100. The control interface 122 comprises one or more an analog, digital, and/or touchscreen displays, and control interface 122 is configured to display, for example, at least part of a travel path and/or at least part of a compaction plan of the present disclosure. Control interface 122 may also support other allied functions, including for example, sharing various operating data with one or more other machines (not shown) operating in consonance with compaction machine 100, and/or with a remote server or other electronic device.

Exemplary compaction machine 100 further includes a location sensor 124 connected to a roof of the operator station 118 and/or at one or more other locations on the frame 104. The location sensor 124 can determine a location of compaction machine 100 and may include and/or comprise a component of a global positioning system (GPS). In one example, the location sensor 124 comprises a GPS receiver, transmitter, transceiver or other such device, and the location sensor 124 is in communication with one or more GPS satellites (not shown) to determine a location of compaction machine 100 continuously, substantially continuously, or at various time intervals.

Compaction machine 100 may also include a communication device 126 configured to enable compaction machine 100 to communicate with the one or more other machines, and/or with one or more remote servers, processors, or control systems located remote from the worksite at which compaction machine 100 is being used. Such a communication device 126 may also be configured to enable compaction machine 100 to communicate with one or more electronic devices located at the worksite and/or located remote from the worksite. In some examples, the communication device 126 includes a receiver configured to receive various electronic signals including position data, navigation commands, real-time information, and/or project-specific information. In some examples, the communication device 126 is also configured to receive signals including information indicative of compaction requirements specific to worksite surface 102. Such compaction requirements may include, for example, a number of passes associated with the worksite surface 102 and required in order to complete the compaction of worksite surface 102, a desired stiffness, density, and/or compaction of worksite surface 102, a desired level of efficiency for a corresponding compaction operation, and/or other requirements. The communication device 126 may further include a transmitter configured to transmit position data indicative of a relative or geographic position of compaction machine 100, as well as electronic data such as data acquired via one or more sensors of compaction machine 100.

Additionally, compaction machine 100 includes a camera 128. The camera 128 may be a state of the art camera capable of providing visual feeds and supporting other functional features of compaction machine 100. In some examples, the camera 128 comprises a digital camera configured to record and/or transmit digital video of the worksite surface 102 and/or other portions of the worksite in real-time. In still other examples, camera 128 comprises an infrared sensor, a thermal camera, or other like device configured to record and/or transmit thermal images of the worksite surface 102 in real-time. In some examples as described in more detail below, camera 128 comprises more than one camera. For example, camera 128 may comprise a camera at the front of the machine and a camera at the rear of the machine For capturing digital video or images to cover 360 degrees around compaction machine 100, cameras on the left and right sides as well as the front and rear sides may be employed.

Compaction machine 100 also includes a controller 130 in communication with steering system 120, control interface 122, location sensor 124, communication device 126, camera 128, sensors 114, 116, and/or other components of compaction machine 100. Controller 130 may be a single controller or multiple controllers working together to perform a variety of tasks. Controller 130 may embody a single or multiple microprocessors, field programmable gate arrays (FPGAs), digital signal processors (DSPs), and/or other components configured to generate a compaction plan, one or more travel paths for compaction machine 100 and/or other information useful to an operator of compaction machine 100. Numerous commercially available microprocessors can be configured to perform the functions of controller 130. Various known circuits may be associated with controller 130, including power supply circuitry, signal-conditioning circuitry, actuator driver circuitry (i.e., circuitry powering solenoids, motors, or piezo actuators), and communication circuitry. In some examples, controller 130 may be positioned on compaction machine 100, while in other examples controller 130 may be positioned at an off-board location and/or remote location relative to compaction machine 100.

FIG. 1 illustrates exemplary components of a compaction machine that may be configured to define a perimeter of a worksite area for a work plan and to determine a geofence for the compaction machine outside the perimeter in a manner discussed in more detail below. Fundamental aspects of compaction machine 100 for performing the actions associated with defining a perimeter and determining a geofence are typically executed by or in conjunction with a control system, diagrammed in FIG. 2 and discussed as follows.

Figure 2:
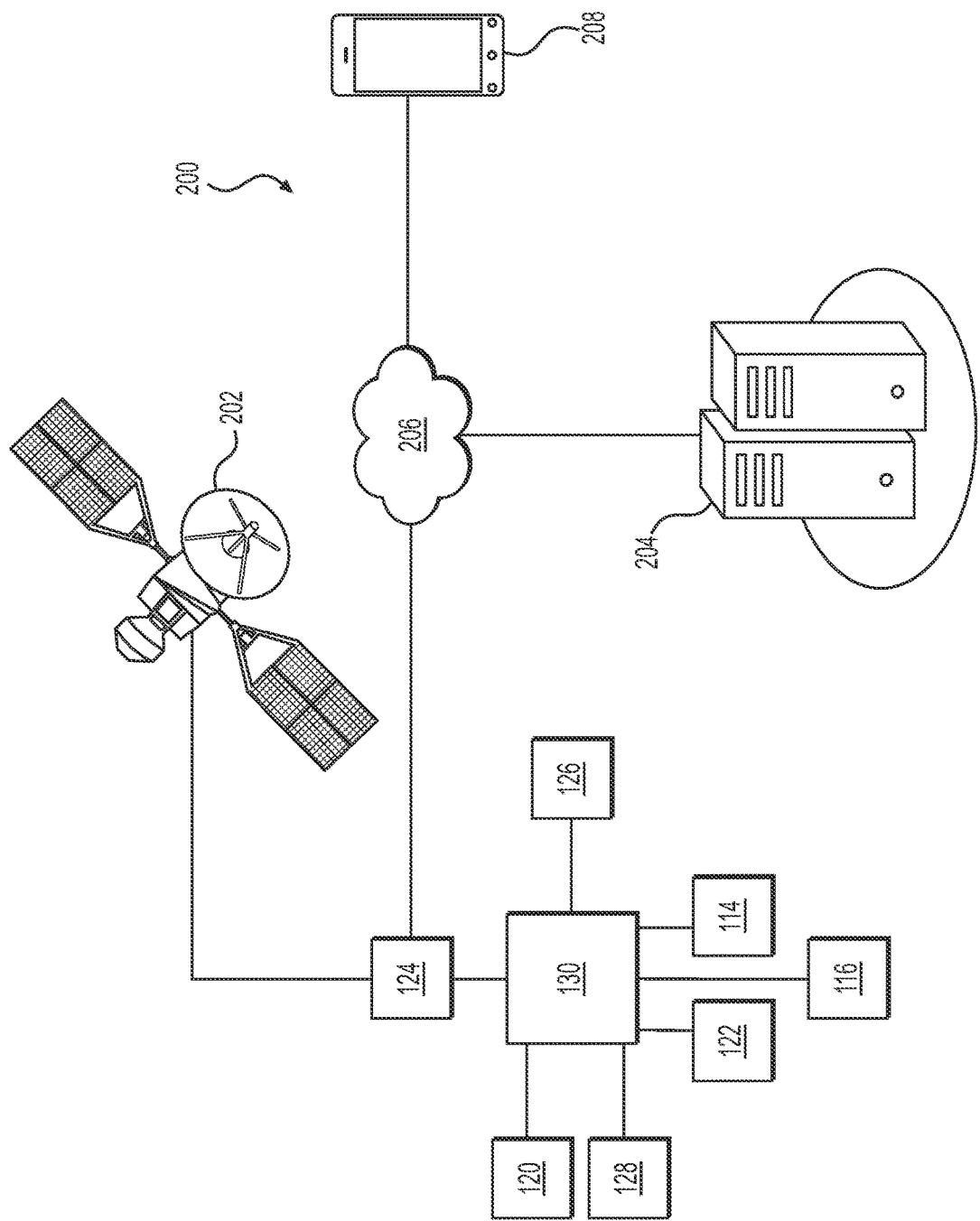
FIG. 2 is a block diagram schematically representing a control system associated with the compaction machine in accordance with an example of the present disclosure.

FIG. 2 is a block diagram schematically illustrating an example control system 200 of the present disclosure. In any of the examples described herein, control system 200 typically includes at least one of controller 130, steering system 120, control interface 122, location sensor 124, communication device 126, camera 128, sensors 114, 116, and/or any other sensors or components of compaction machine 100. In such examples, controller 130 is configured to receive respective signals from such components. For example, controller 130 receives one or more signals from location sensor 124 including information indicating a location of compaction machine 100. In some examples, location sensor 124 may be configured to determine the location of compaction machine 100 as compaction machine 100 traverses a perimeter of worksite surface 102 and/or as compaction machine 100 travels to any other worksite location.

As shown in FIG. 2, location sensor 124 is connected to and/or otherwise in communication with one or more satellites 202 or other GPS components configured to assist location sensor 124 in determining the location of compaction machine 100 in any of the example processes described herein. In some examples, such satellites 202 or other GPS components comprise components of control system 200. In any of the examples described herein, location sensor 124 either alone or in combination with satellite 202 are configured to provide the controller with signals including information indicative of a location of the perimeter of worksite surface 102, the location of compaction machine 100, and/or other information. Such information includes GPS coordinates of each point along such perimeters and/or of each point along a travel path of the compaction machine. Such information may be determined substantially continuously during movement of compaction machine 100. Alternatively, such information may be determined at regular time intervals (milliseconds, one second, two seconds, five seconds, ten seconds, etc.) as compaction machine 100 travels. Further, any such information is typically stored in a memory associated with controller 130. Such memory may be disposed on compaction machine 100 and/or may be located in the cloud, on a server, and/or on any other electronic device located remote from compaction machine 100.

In certain examples, controller 130 receives respective signals from sensors 114, 116. As noted above, sensors 114, 116 are configured to determine a density, stiffness, compactability, and/or other characteristic of worksite surface 102. Such sensors 114, 116 may also be configured to determine the vibration frequency, vibration amplitude, and/or other operational characteristics of first drum 106 and second drum 108, respectively. In some examples, sensor 114 determines a density, stiffness, compactability, and/or other characteristic of a portion of the worksite surface 102 proximate the first drum 106 and/or located along a travel path of compaction machine 100. The sensor 114 typically sends one or more signals to controller 130 including information indicative of such a characteristic, and controller 130 may control vibratory mechanism 110 to modify at least one of a vibration frequency of first drum 106 and a vibration amplitude of first drum 106, as compaction machine 100 traverses the travel path, based at least partly on such information. Similar behavior may be obtained using sensor 116 with respect to second drum 108, if present.

As shown in FIG. 2, control system 200 also includes one or more additional components. For example, control system 200 may include one or more remote servers, processors, or other such computing devices 204. Such computing devices 204 may comprise, for example, one or more servers, laptop computers, or other computers located at a paving material plant remote from the worksite at which compaction machine 100 is being used. In such examples, communication device 126 and/or controller 130 are connected to and/or otherwise in communication with such computing devices 204 via a network 206. The network 206 may be a local area network ("LAN"), a larger network such as a wide area network ("WAN"), or a collection of networks, such as the Internet. Protocols for network communication, such as TCP/IP, may be used to implement the network 206. Although examples are described herein as using a network such as the Internet, other distribution techniques may be implemented that transmit information via memory cards, flash memory, or other portable memory devices.

Control system 200 may further include one or more tablets, mobile phones, laptop computers, and/or other mobile devices 208. Such mobile devices 208 may be located at the worksite or, alternatively, one or more such mobile devices 208 may be located at the paving material plant described above, or at another location remote from the worksite. In such examples, communication device 126 and/or controller 130 are connected to and/or otherwise in communication with such mobile devices 208 via network 206. In any of the examples described herein, information indicative of the location of the perimeter of the worksite surface 102, a compaction plan, a travel path of compaction machine 100, vibration amplitudes, vibration frequencies, a density, stiffness, or compactability of the worksite surface 102, and/or any other information received, processed, or generated by controller 130 may be provided to computing devices 204 and/or mobile devices 208 via network 206.

Figure 3:
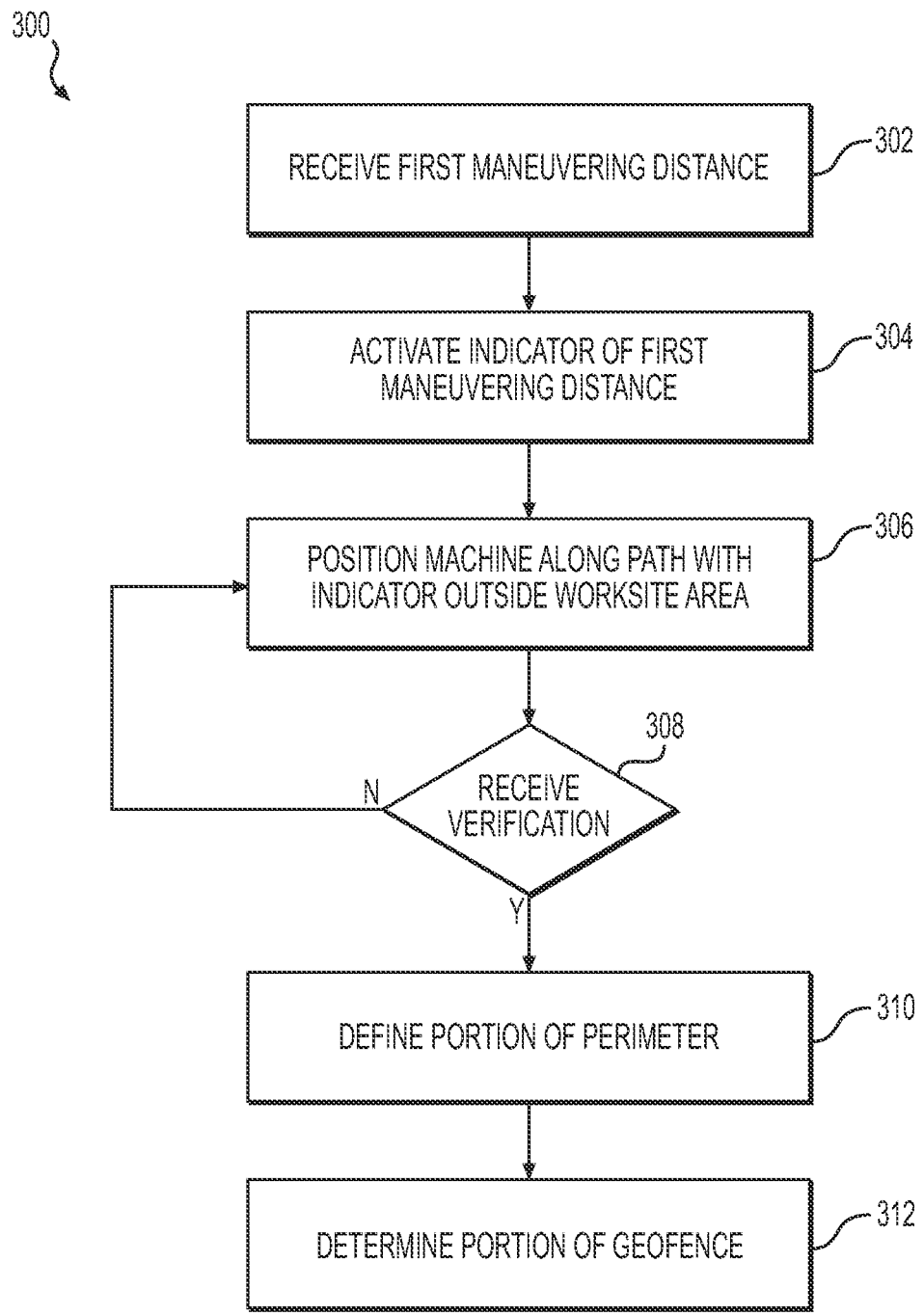
FIG. 3 is a flow chart depicting a method of generating a compaction plan in accordance with an example of the present disclosure.

Through the actions generally of control system 200 as detailed above for FIG. 2, compaction machine 100 can define a perimeter of a worksite area for a work plan and determine a geofence for compaction machine 100 outside the perimeter. FIG. 3 indicates representative actions of control system 200 and other components in achieving those results.

FIG. 3 illustrates a flow chart depicting a method 300 of defining a perimeter and determining a geofence boundary of a worksite in accordance with an example of the present disclosure. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, controller 130, such instructions cause controller 130, various components of control system 200, and/or compaction machine 100, generally, to perform the recited operations. The computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, method 300 is described with reference to compaction machine 100 of FIG. 1 and control system 200 of FIG. 2. FIG. 3 serves as an outline of the method performed, and various aspects of method 300 will be described with reference to FIGS. 4-9.

At 302, controller 130 receives first information indicative of a first maneuvering distance from a side of a machine from one or more remote servers, processors, computing devices 204, electronic devices 208, and/or other components of control system 200. Although not limited to a particular geometry, the first maneuvering distance may be a distance generally orthogonal to a side of the compaction machine that defines an area adjacent to that side where the machine may acceptably maneuver during operation, if needed. To "acceptably maneuver" refers to the machine moving into a buffer region laterally defined by the first maneuvering distance, where in the judgment of the operator setting up method 300 the movement is safe for the machine, its operator, and the terrain within the buffer region. As discussed in more detail below, movement of the machine into the buffer zone may occur either incidentally or purposefully.

In accordance with implementations consistent with the present disclosure, a maneuvering distance may encompass various forms with respect to compaction machine 100. In one implementation, a maneuvering distance from a side of a machine is a distance orthogonal to the right or left side of compaction machine 100 that defines a buffer region along the corresponding right or left side of compaction machine 100. The buffer region is intended to provide an allowable region where compaction machine 100 may travel beyond an area the machine is compacting to account for factors such as steering deviations, braking imprecision, turning maneuvers, directional changes, terrain imperfections, and the like. The maneuvering distance and buffer region may be selected conservatively to provide a wide space for compaction machine 100 to operate outside a worksite surface to be compacted, if needed. On the other hand, the maneuvering distance and buffer region may at a minimum identify where compaction machine 100 is reasonably expected to travel incidentally or unintentionally during forward or reverse movement outside a compaction area while under autonomous or semi-autonomous control.

Figure 4:
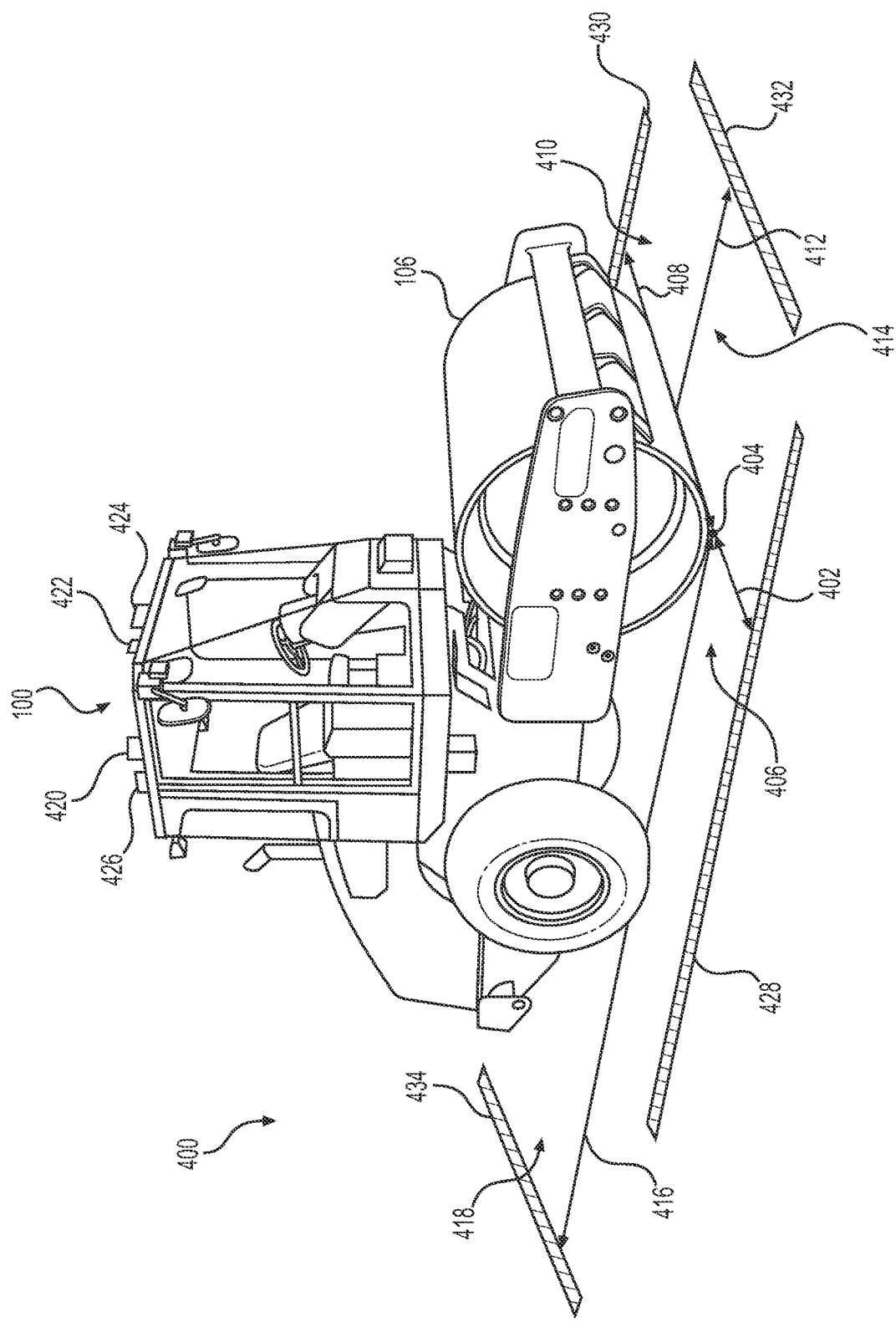
FIG. 4 is a perspective view of a compaction machine with corresponding indicators in accordance with an example of the present disclosure.

FIG. 4 illustrates a compaction machine 100 positioned at a worksite 400 with exemplary maneuvering distances separated from the right, left, front, and rear of machine 100. As generally represented in FIG. 4, the maneuvering distance in one form is a right maneuvering distance 402 extending essentially perpendicular from, and to the right of, compaction machine 100 with respect to its forward direction of travel. For simplicity of discussion, FIG. 4 depicts a version of compaction machine 100 having a single drum 106, such as may be preferred for compacting soil. Other variations of compaction machine 100 including those having first and second drums, as in FIG. 1, are also within the scope of this disclosure and extensions of the following discussion for a machine having two drums will be readily apparent to those of ordinary skill in the field. Right maneuvering distance 402 identifies a width for a right buffer region 406, which is an area along the right side of compacting machine 100. As shown, right maneuvering distance 402 extends outwardly from a starting point 404 at the right lower edge of first drum 106. Starting point 404 could be any other location on compaction machine 100, such as a middle of compaction machine 100 or a left lower edge of first drum 106 as desired, with appropriate mathematical adjustments being made to adjust right maneuvering distance 402 to represent a distance from the right side of compaction machine 100. Other modifications to the relationships discussed in this disclosure flowing from a different starting point will be within the knowledge of those of ordinary skill in the field.

Right buffer region 406 denotes a ground area where compaction machine 100 may safely travel and may be of substantial width, such as that equaling or exceeding the width of compaction machine 100. In the example of FIG. 4, right buffer region 406 is equal to about half a width of compaction machine 100 or less. At a minimum, right buffer region 406 is a zone where compaction machine 100 is reasonably expected and permitted to travel incidentally as it moves forward or backward along a perimeter of a worksite surface when under autonomous or semi-autonomous control. This incidental travel may arise if compaction machine 100 articulates, lurches, or otherwise moves aside from a linear path as it advances. Such articulation may be caused at least by the vibratory movement first drum 106, as caused by first vibratory mechanism 110, together with the mass of drum 106. The inexact steering mechanism of compaction machine 100 combined with the likely irregularity of worksite surface 102 over which compaction machine 100 travels, such as from a surface slope or rough granularity, may also contribute to periodic deviation from a straight path. Moreover, incidental lateral movement of compaction machine 100 may result from positional coordinates that guide compaction machine 100 in an autonomous or semi-autonomous mode having some variation from the actual terrain being compacted. Other similar factors to be considered in assessing the reasonably expected lateral deviation of compaction machine 100 outside a perimeter of a compaction area are within the knowledge of individuals having ordinary skill in the field.

Determination of the expected movement of compaction machine 100 outside a line being traversed along perimeter of worksite 400 may be calculated in advance by employing modeling techniques or evaluating factors such as steering performance characteristics of the particular compaction machine 100 being used, traversal data from previous operations, conditions of the worksite surface 102, and the type and precision of the positional guidance system used with the autonomous or semi-autonomous mode. Alternatively, right maneuvering distance 402 could be an essentially arbitrary value selected in the judgment of the operator to be in excess of a distance in which compaction machine 100 would reasonably be expected to deviate outside its line of travel. As well, right maneuvering distance 402 could be selected to correspond to the width of a safety zone applied by a legacy control system on the inside of a perimeter on the right side of a rectangular worksite. Right maneuvering distance 402 may be stored as first information in one or more remote servers, processors, computing devices 204, electronic devices 208, and/or other components of control system 200, from which it would then be received at 302 as part of executing method 300 in FIG. 3.

Similar to right maneuvering distance 402, FIG. 4 illustrates a left maneuvering distance 408. Left maneuvering distance 408 extends essentially perpendicular from, and to the left of, compaction machine 100 with respect to the forward direction of travel for the machine. Left maneuvering distance 408 defines a left buffer region 410 in which compaction machine 100 is reasonably expected and permitted to travel as it moves forward or backward along a linear path, such as when traversing a perimeter of worksite 400 when under autonomous or semi-autonomous control. Left maneuvering distance 408 may be measured with respect to starting point 404, as with right maneuvering distance 402. Any other location on compaction machine 100 could be chosen for a starting point for left maneuvering distance 408, such as the left lower edge of first drum 106. With starting point 404, appropriate mathematical adjustments would be made to include the width of first drum 106 in determining the maneuvering space desired to the left of compaction machine 100, as is apparent to one of ordinary skill in the field. Factors for consideration in determining left maneuvering distance 408 follow those discussed above for determining right maneuvering distance 402. Left maneuvering distance 408 may be stored as first information in one or more remote servers, processors, computing devices 204, electronic devices 208, and/or other components of control system 200, from which it would then be received at 302 as part of executing method 300 of FIG. 3.

As generally represented in FIG. 4, another form of a maneuvering distance for compaction machine 100 may be a front maneuvering distance 412. Similar to right maneuvering distance 402 and left maneuvering distance 408, and as discussed in additional detail below, front maneuvering distance 412 defines a front buffer region 414 that is relatively wide and arbitrarily sized to provide a safe space for compaction machine 100 to move beyond a compaction area within worksite 400. At a minimum, front maneuvering distance 412 may indicate a distance orthogonal to a front side of compaction machine 100 in which, while ending forward movement and executing a stop and reversal, compaction machine 100 incidentally exceeds a stopping location along a perimeter of a compaction area. As shown for the example in FIG. 4, front maneuvering distance 412 identifies a width for a front buffer region 414 beginning from a starting point at the front of compaction machine 100, such as at the base of first drum 106. The beginning of front maneuvering distance 412 may be starting point 404 or, as shown in FIG. 4, another location co-linear with starting point 404 at the base of first drum 106. Other locations within compaction machine 100 may alternatively be chosen as the beginning of front maneuvering distance 412.

As with right buffer region 406 and left buffer region 410, front buffer region 414 denotes a ground area where compaction machine 100 is reasonably expected and permitted to travel outside a compaction area during forward or reverse movement when under autonomous or semi-autonomous control. This travel may arise if compaction machine 100 does not stop precisely at a perimeter of the compaction area, which may be due to a variety of factors including, for example, planned or maximum travel speed of compaction machine 100, momentum of compaction machine 100, braking performance and ISO stopping distance for compaction machine 100, and irregularity of worksite surface 102 over which compaction machine 100 travels. The time it takes for the vibratory system of compaction machine 100 to stop, and therefore the distance traversed at maximum or expected travel speed for that stoppage, may also be accounted for. Front maneuvering distance 412 may also account for space for compaction machine 100 to reposition itself as needed after completing a first pass along a perimeter for retracing a pass, or executing a new parallel pass, over worksite surface 102 in the opposite direction. Moreover, depending on the geometry of the compaction area and the expected work plan, front maneuvering distance 412 could account for space for compaction machine 100 to make a turn to the left or right and continue compacting along the perimeter at an angle to its previous direction. Other factors affecting the determination of front maneuvering distance 412 may depend on the characteristics of compaction machine 100, the particular work plan developed for compaction machine 100, and the type and precision of the positional guidance system used with the autonomous or semi-autonomous mode. Similar factors to be considered in assessing the reasonably expected forward deviation of compaction machine 100 outside a perimeter of a compaction area are within the knowledge of individuals having ordinary skill in the field.

Similar to right maneuvering distance 402 and left maneuvering distance 408, a minimum expected value for front maneuvering distance 412 may be determined in advance by employing modeling techniques or evaluating factors such as steering performance characteristics of the particular compaction machine 100 being used, traversal data from previous operations, conditions of the worksite surface 102, and the type and precision of the positional guidance system used with the autonomous or semi-autonomous mode. For example, based on a model of compaction machine 100, characteristics relating to weight, power, and vibration may be considered in determining a real stopping distance. ISO braking tests may be known for or performed on the model of compaction machine 100 to be employed, which may indicate worst case stopping distances in particular situations. Further, speeds at which compaction machine 100 is expected to operate under a work plan may affect the anticipated stopping distance for compaction machine 100. As a result, stopping behavior for compaction machine 100 may be evaluated in determining the expected movement of compaction machine 100 outside a perimeter in a forward direction and to identify a suitable front maneuvering distance 412. Front maneuvering distance 412 could be a minimum value to accommodate a stopping tolerance for compaction machine 100, an arbitrary value in excess of a conceivable distance in which compaction machine 100 would reasonably be expected to deviate beyond a perimeter passing under first drum 106, or any other distance deemed suitable to the implementation. As well, front maneuvering distance 412 could be selected to correspond to the width of a safety zone applied by a legacy control system on the inside of a perimeter on the front side of a rectangular worksite. Front maneuvering distance 412 may be stored as first information in one or more remote servers, processors, computing devices 204, electronic devices 208, and/or other components of control system 200, from which it would then be received as 302 part of executing method 300 of FIG. 3.

As generally represented in FIG. 4, another form of a maneuvering distance for compaction machine 100 may be a rear maneuvering distance 416. Similar to the other described maneuvering distances, rear maneuvering distance 416 defines a rear buffer region 418 that is wide and arbitrarily sized to provide ample space for compaction machine 100 to maneuver outside a compaction zone. As shown in FIG. 4, rear maneuvering distance 416 may be defined from starting point 404 (or any other location co-linear with starting point 404 under first drum 106). As a result, for compaction machine 100 as illustrated in FIG. 4 having only a single first drum 106, rear maneuvering distance 416 typically accounts for the portion of compaction machine 100 rearward of where first drum 106 contacts the ground. When compaction machine 100 is moved in reverse to where a perimeter of a compaction area passes under first drum 106, rear maneuvering distance 416 may include at least the rear portion of compaction machine 100 that has moved outside the compaction area.

Incidental or expected movements of compaction machine 100 outside a compaction area may also be included in calculating rear maneuvering distance 416. For instance, rear maneuvering distance 416 may account for incidental movement due to inertia of compaction machine 100 in steering or stopping, as discussed above for front maneuvering distance 412. In addition, rear maneuvering distance 416 typically entails expected movement of compaction machine 100 in executing a turn and reversing in direction. For example, a work plan for controlling compaction machine 100 in an autonomous or semi-autonomous mode often includes having compaction machine 100 make a series of substantially linear passes across a polygonal area. These substantially linear passes involve having compaction machine 100 travel forward longitudinally on a first path, travel backwards longitudinally on the first path, and then travel forward longitudinally on a second path that overlaps and is in parallel with the first path. In making the change from traveling backwards on the first path to traveling forwards on the second path, compaction machine 100 may need to execute a turn that requires space for maneuvering. The turn may be an "S" turn or any other type of turning maneuver. Executing the turn may require compaction machine 100 to travel significantly beyond the intended compaction area as defined by a perimeter. In the event a work plan is expected to involve compaction machine 100 executing turns at only one end of a worksite surface 102 after making longitudinal, parallel paths, rear maneuver distance 416 and rear buffer area 418 would be substantially larger than the corresponding distances and areas at other sides of compaction machine 100, such as right buffer area 406, left buffer area 410 and front buffer area 414. As well, rear maneuvering distance 416 could be selected to correspond to the width of a safety zone applied by a legacy control system on the inside of a perimeter on the rear side of a rectangular worksite. Rear maneuvering distance 416 may be stored as first information in one or more remote servers, processors, computing devices 204, electronic devices 208, and/or other components of control system 200, from which it would then be received at 302 as part of executing method 300 in FIG. 3.

In accordance with various implementations of the present disclosure, as indicated in FIG. 3, method 300 includes at 304 activating an indicator corresponding to the first maneuvering distance at a side of the machine. An indicator may be any time of marker, line, hash, insignia, icon, glyph, or other type of demarcation visible to an operator of compaction machine 100. Examples of indicators are described further below. An indicator is positioned at a location to represent to an operator of compaction machine 100 the first maneuvering distance received by controller 130, i.e., one or more of right maneuvering distance 402, left maneuvering distance 408, front maneuvering distance 412, and rear maneuvering distance 416.

In one example, an indicator may be a high-intensity light projected onto ground at a distance from compaction machine 100 corresponding to the first maneuvering distance. As embodied in FIG. 4, compaction machine 100 includes lights 420, 422, 424, and 426 or similar structures capable of illuminating a demarcation of a maneuvering distance from a respective side of compaction machine 100. Lights 420, 422, 424, and 426 project corresponding indicators 428, 430, 432, and 434. In particular, right light source 420 may be activated to generate right indicator 428 on the ground to represent right maneuvering distance 402 with respect to compaction machine 100. Left light source 422 may be activated to generate left indicator 430 on the ground to communicate left maneuvering distance 408 with respect to compaction machine 100. Front light source 424 may be activated to generate front indicator 432 on the ground at front maneuvering distance 412 from the front of compaction machine 100. Rear light source 426 may be activated to generate rear indicator 434 on the ground to communicate to an operator rear maneuvering distance 416 with respect to compaction machine 100. While FIG. 4 illustrates four separate light sources 420, 422, 424, and 426, fewer or more than those four sources could be activated. For instance, in some implementations, sources of indicators for different sides of compaction machine 100 could be consolidated into a single device, e.g., right light source 420 and front light source 424 could be combined into a single device that provide both right indicator 428 and front indicator 432. Moreover, the lights could be consolidated into a single source that illuminates all or a subset of indicators 428, 430, 432, and 434. The implementation of light sources on compaction machine 100 to activate one or more indicators corresponding to one or more maneuvering distances is within the routine experimentation and design choice of a person of ordinary skill in the field and is not intended to be limiting to the present disclosure.

In a manner discussed further below, right light source 420, left light source 422, front light source 424, and rear light source 426 may be separately controllable to provide respective indicators separately or together as desired. For instance, right light source 420 and front light source 424 may be activated while left light source 422 and rear light source 426 are deactivated. In this way, right indicator 428 and front indicator 432 could be displayed, while left indicator 430 and rear indicator 434 are not displayed. Other combinations of activation and deactivation for light sources on compaction machine 100 may also be possible as desired.

Light sources 420, 424, 426, and 428 may be any type or make having the ability to project light on the ground visible to an operator, preferably from within operator station 118 of compaction machine 100. For projecting an indicator essentially as a line, one option may be an array of light-emitting diodes (LEDs) with a polycarbonate lens to project from the roof or side of operator station 118. The LEDs and lens may provide a high-intensity and focused light as a beam onto the adjacent ground. An LED apparatus may also provide color to the light or changes to the light intensity to help make the indicators more noticeable by an operator. Other options for providing a high-intensity and focused beam of light may include laser lights and additional technology within the knowledge of those skilled in the field. Alternative implementations for light sources 420, 424, 426, and 428 could include devices emitting a more diffuse display of light on the ground, such as might illuminate a substantial portion of one or more buffer regions 406, 410, 414, and 418. These diffuse implementations may include variations for denoting the edge of a buffer region at the respective maneuvering distance from a side of compaction machine 100, such as a higher intensity illumination along that distance.

While FIG. 4 illustrates an exemplary machine 100 with maneuvering distances set apart from its four sides, together with indicators on the ground corresponding to the maneuvering distances, other means can visually represent the maneuvering distances to an operator. For instance, alternative or additional to a demarcation of light on the ground as represented in FIG. 4, method 300 at 304 includes activating an indicator visible to an operator of the machine on a video display fed from a camera. Camera 128 on top of compaction machine 100 may be positioned at an angle downward to capture footage of the ground along one or more sides of compaction machine 100. The images from camera 128 may be adjusted or processed, or the display showing the images may be marked, to represent the maneuvering distances as captured by camera 128, as discussed below regarding FIG. 5.

Figure 5:
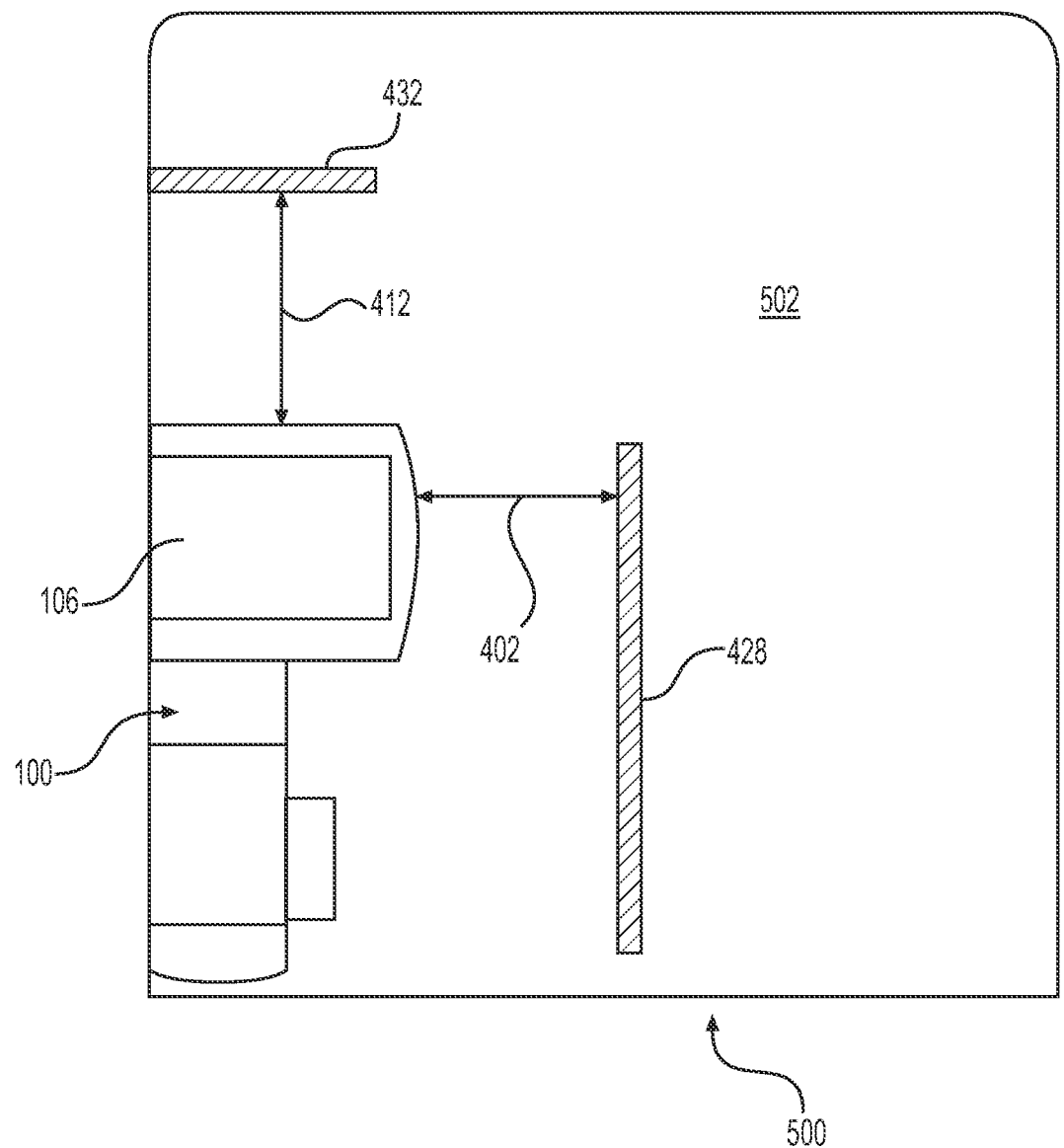
FIG. 5 is an example screenshot of an image on a camera display in accordance with an example of the present disclosure.

FIG. 5 illustrates an exemplary screenshot of an image 502 within display 500 as fed from camera 128. Display 500 may comprise an analog, digital, and/or touchscreen display, and may be installed in operator station 118 or at a remote location. Moreover, display 500 may be part of control interface 122, or display 500 may be a unit separate from control interface 122.

As represented in FIG. 5, display 500 presents an image 502 captured by camera 128, either in still or video form. In one implementation, the positioning of camera 128 reveals the top of a portion of compaction machine 100 and the surrounding ground. Display 500 includes indicators, such as right indicator 428 and front indicator 432, superimposed on image 502 received from camera 128. In this implementation, right indicator 428 and front indicator 432 are icons or glyphs that are computer-generated and displayed over or added to image 502.

Mathematical correlation may be conducted to determine the proper spacing between a side of compaction machine 100 and the respective indicator. For example, if front maneuvering distance 412 is previously determined at 302 in method 300 to be two meters, a 1:100 ratio for the zoom on display 500 may result in a placement of front indicator 432 at two centimeters in front of first drum 106 on image 502. Similar relationships may be derived for placing right indicator 428 within image 502 such that display 500 shows an accurate relationship of positions between compaction machine 100 and right indicator 428.

Variations to the use of camera 128 and display 500 will be apparent to those of ordinary skill in the field and are not limiting to this disclosure. For example, camera 128 may comprise multiple cameras to provide perspectives from compaction machine 100 of multiple sides. Views on display 500 may shift between the multiple cameras so the operator can see different indicators from different sides of compaction machine 100. As well, feeds from multiple cameras could be stitched together with known digital processing to provide image 502 as a composite of multiple camera images. With such stitching, display 500 may provide the operator with up to a 360-degree view simultaneously around compaction machine 100 for evaluating multiple of the indicators and their respective buffer regions.

Figure 6:
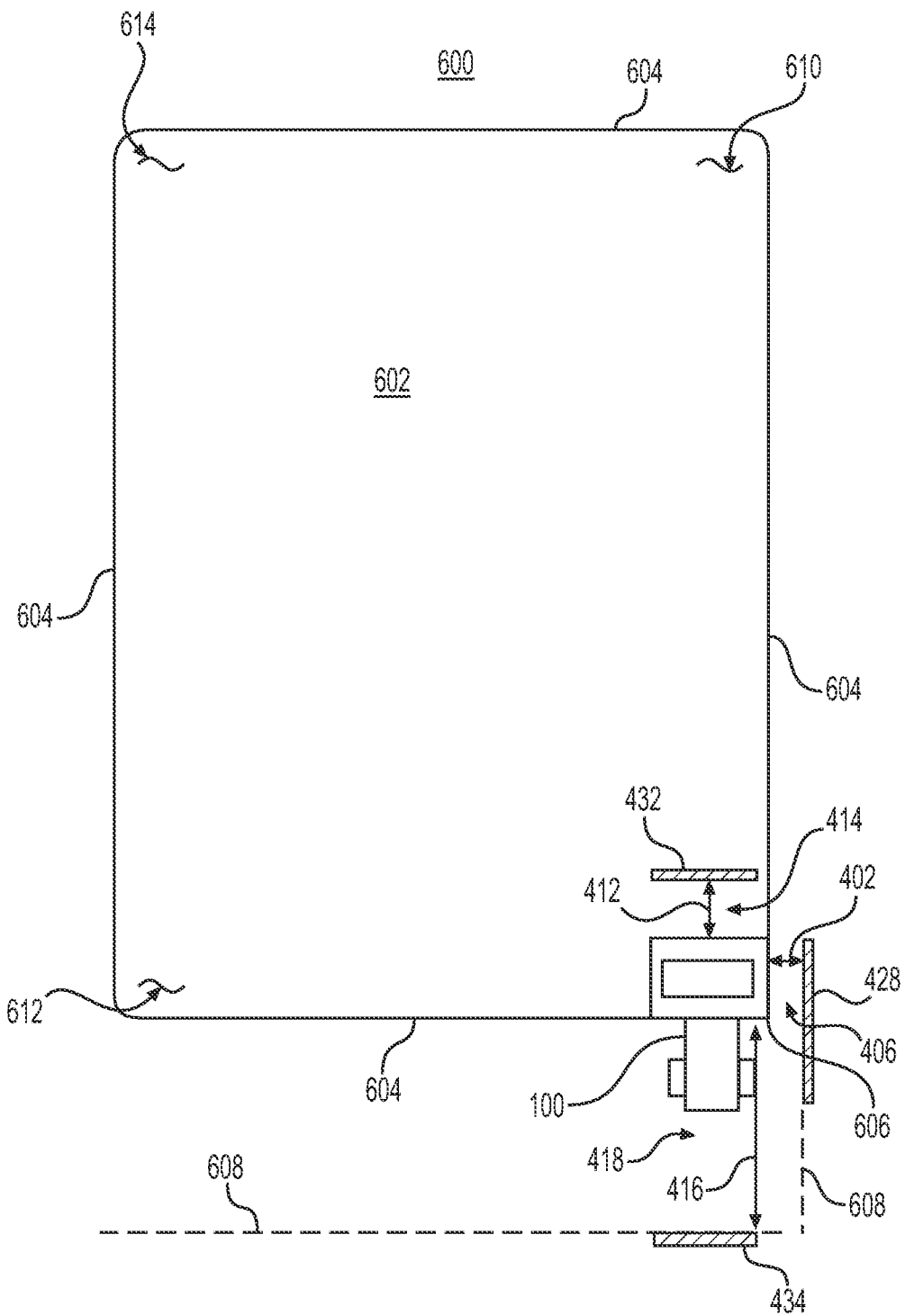
FIG. 6 is a schematic illustration of a worksite including a compaction machine at a first stage of defining a perimeter and boundary for a compaction area according to an example of the present disclosure.
Figure 7:
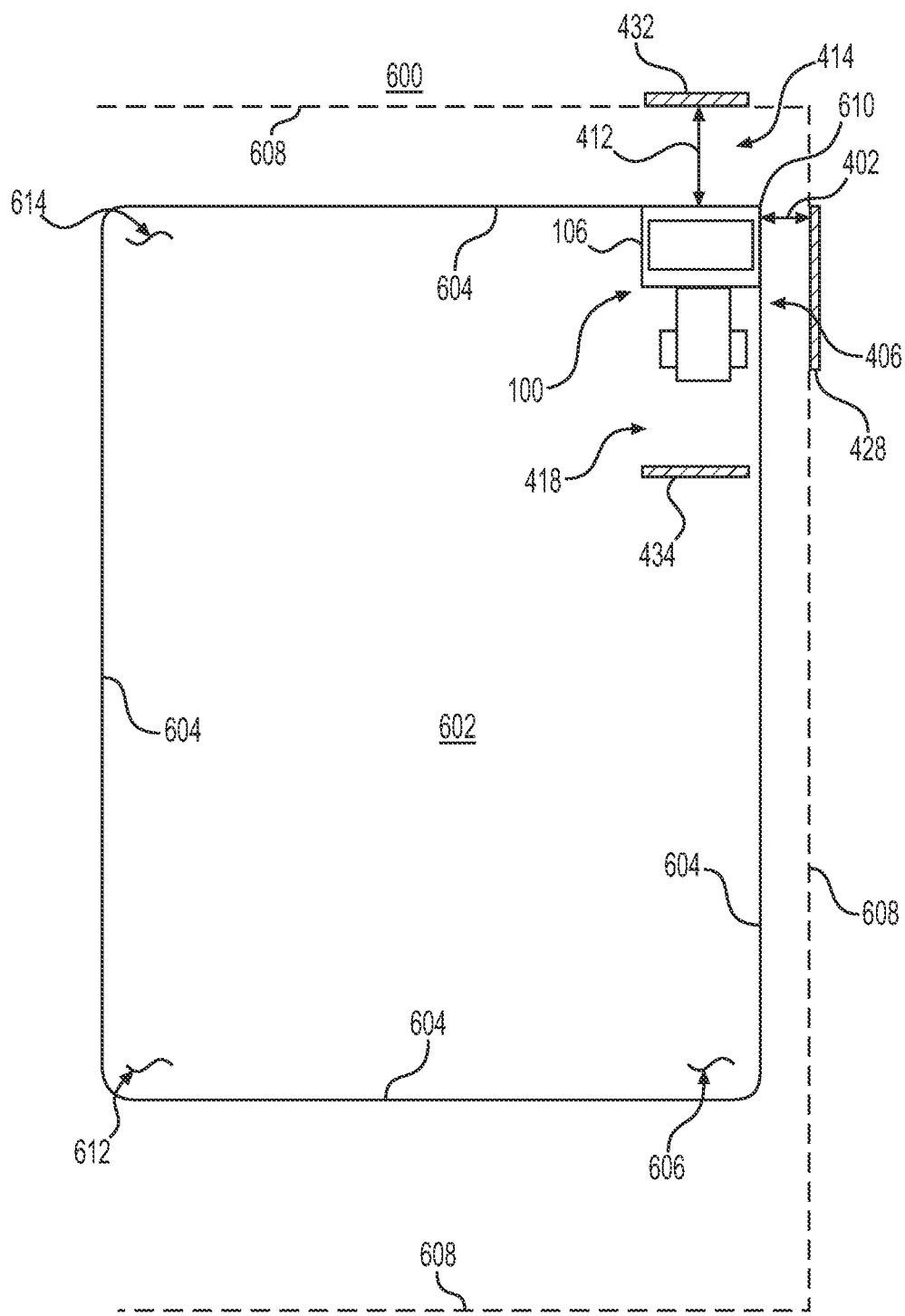
FIG. 7 is a schematic illustration of the worksite shown in FIG. 6, including a compaction machine at a second stage of defining a perimeter and boundary for a compaction area according to an example of the present disclosure.
Figure 8:
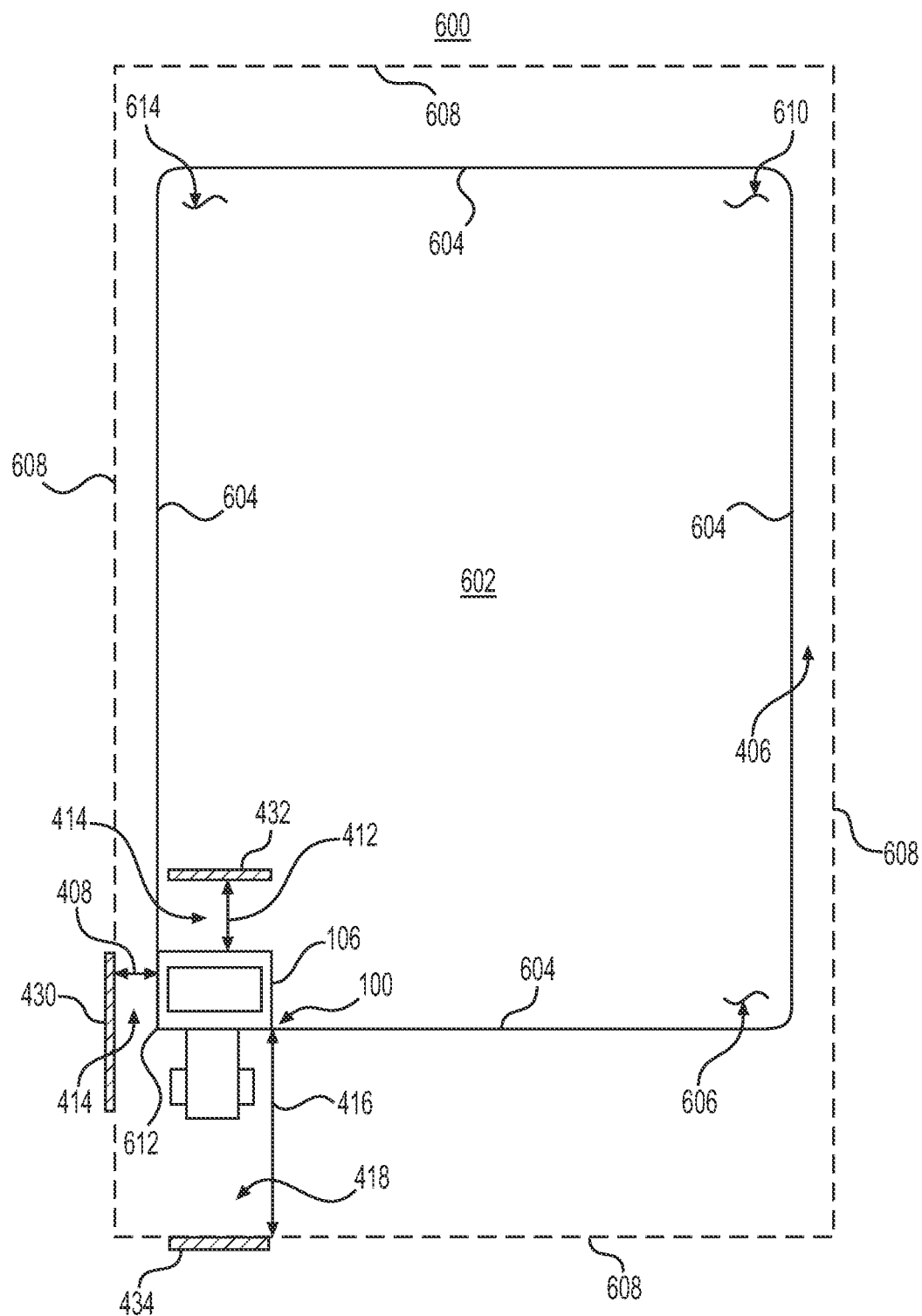
FIG. 8 is a schematic illustration of the worksite shown in FIGS. 6 and 7, including a compaction machine at a third stage of defining a perimeter and boundary for a compaction area according to an example of the present disclosure.

While FIGS. 4 and 5 illustrate options for showing indicators for visual observance by an operator either on the ground or on a camera display, FIGS. 6-8 depict steps involved in using the indicators to define at least a portion of a perimeter of a worksite area for a work plan and to determine at least a portion of a geofence for the machine that substantially overlays the position of one or more of the indicators. In accordance with various implementations of the present disclosure, following activation of an indicator, a next step in method 300 involves compaction machine 100 being positioned at a starting location on a worksite for recording a perimeter of an area to be compacted, as represented as 306.

As generally embodied in FIG. 6, a worksite 600 includes a compaction area 602 representing a land area intended to be compacted. Compaction area 602 includes worksite surface 102 comprising soil, gravel, pavement, or any other material or substance. Shown in FIG. 6 as a substantially rectangular shape, compaction area 602 is bounded on four sides by perimeter 604. For example, the substantially rectangular shape shown in FIG. 6 is illustrative of a worksite comprising a parking lot, roadway, field, and/or other such surface having a substantially uniform shape and/or that substantially corresponds to a single polygonal shape (e.g., a rectangle). A compaction plan for compaction area 602 and corresponding travel paths may be generated to maximize the efficiency with which compaction machine 100 may perform a compaction operation on the substantially rectangular area. While depicted as a rectangle for purposes of discussion, perimeter 604 and its resulting compaction area 602 may have any shape, including other polygonal or circular shapes, as dictated by factors such as property boundaries or the task to be performed without departing from this disclosure.

Compaction machine 100 in FIG. 6 is initially positioned at a starting point at a corner of compaction area 602, such as at lower right corner 606, although any location along perimeter 604 would suffice. At lower right corner 606, compaction machine 100 has first drum 106 positioned where it would begin compacting for compaction area 602. The operator would then observe the activated indicators, which in FIG. 6 are right indicator 428, front indicator 432, and rear indicator 434. As discussed above, the activated indicators may be visual markings from lights on the ground, which the operator would observe from operator station 118 or remotely from outside compaction machine 100. Alternatively, the activated indicators may be graphical depictions overlaid on camera images, which the operator would observe on display 500. In either implementation, the operator can inspect the corresponding buffer region to each indicator positioned outside perimeter 604, namely for FIG. 6, right buffer region 406 and rear buffer region 418. In the inspection, the operator would ensure that each region is safe for the machine, for personnel, and for the terrain if compaction machine 100 were to travel within it. For example, the operator may inspect the regions to ensure the absence of operational risks such as a trench, ditch, body of water, manhole, electrical connection, wooded area, and/or any other area that may not require compaction or that may pose a danger. If the regions are not safe, the operator may need to decrease the maneuvering distances, such as right maneuvering distance 402 or rear maneuvering distance 416, to ensure that the corresponding buffer regions are areas in which compaction machine 100 may safely travel.

Following visual inspection, the operator may provide one or more commands or inputs to control system 200 via control interface 122 indicating commencement of a learning mode for programming perimeter 604 for future operation in autonomous or semi-autonomous mode. At least at this time, location sensor 124 and/or other components of control system 200 may determine a location of compaction machine 100 at worksite 600. Location sensor 124 and/or other components of control system 200 generate one or more signals including information indicative of the location of compaction machine 100, and may provide such signals to controller 130. Accordingly, controller 130 receives one or more signals from location sensor 124 and/or other components of control system 200, and such signals may include GPS coordinates (e.g., latitude and longitude coordinates), map information, and/or other information determined by the location sensor 124 and indicating the location of compaction machine 100. Such signals may also include timestamp information indicating the moment in time (e.g., hour, minute, second, millisecond, etc.) at which the location information or other information included in the signal was determined.

Based on additional input from the operator or from data previously entered and stored within control system 200, control system 200 may record at least initial positional coordinates regarding the location and dimension of a boundary 608. Boundary 608 substantially corresponds to the position of indicators outside perimeter 604, which in the example of FIG. 6 are right indicator 428 and rear indicator 434. Based on their locations, control system 200 would record initial locations for boundary 608 as shown at least in a dashed line below compaction area 602 and the beginning of a dashed line at the lower right of compaction area 602. Other partial recordings of boundary 608 when compaction machine 100 is positioned at its starting position 606 may be made as determined by the ordinarily skilled artisan.

In an example method of the present disclosure, the operator then causes compaction machine 100 to travel along perimeter 604 of compaction area 602 from lower right corner 606 to upper right corner 610. In such examples, the operator drives compaction machine 100 along a path defining perimeter 604 from operator station 118 located on compaction machine 100 or, alternatively, from a remote location through the use of a remote control interface that is in communication with compaction machine 100. Compaction machine 100 is driven so that starting point 404, or at least the outer edge of first drum 106 as it compacts soil, aligns with the intended location of perimeter 604. As compaction machine 100 traverses a path to define the right side of perimeter 604, the operator would visually inspect, whether by observing the terrain from operator station 118 or by observing images on display 500, that ground zones between one or more sides of compaction machine 100 and activated indicators are clear and safe for passage by compaction machine 100, as needed. For the example illustrated in FIG. 6, as compaction machine 100 is driven forward, only right indicator 428 would be outside the path intended for perimeter 604. The operator would inspect and confirm that the corresponding right buffer region 406 as defined by right maneuvering distance 402 and right indicator 428 are acceptably clear for travel by compaction machine 100 as needed for future operation in an autonomous or semi-autonomous mode.

In one implementation consistent with the present disclosure, controller 130 receives information indicative of the location of perimeter 604 from location sensor 124 based at least partly on compaction machine 100 traversing a path to define perimeter 604 of compaction area 602. That is, as compaction machine 100 travels forward, its location defines perimeter 604 within controller 130. Location sensor 124 and/or other components of control system 200 generate one or more signals including information indicative of the location of perimeter 604 and may provide such signals to controller 130. The received signals may include GPS coordinates (e.g., latitude and longitude coordinates), map information, and/or other information determined by location sensor 124 and indicating the location of perimeter 604. Such signals may also include timestamp information indicating the moment in time (e.g., hour, minute, second, millisecond, etc.) at which the location information or other information included in the signal was determined. Additionally or alternatively, as compaction machine 100 defines perimeter 604 through its movement, controller 130 may also record positional coordinates with respect to boundary 608 as defined, in the example of FIG. 6, by one or more of right indicator 428 or right maneuvering distance 402. For example, controller 130 may calculate a position for a right side of boundary 608 by receiving the GPS coordinates of compaction machine 100, as its movement defines the right side of perimeter 604 in FIG. 6, and adjusting the coordinates to account for right maneuvering distance 402. Alternatively, after calculating the position for the right side of boundary 608, controller 130 could provide that position to a legacy software system as the position of the defined right perimeter. The legacy software system may then subtract its right safety zone from the position of boundary 608, leading to the same compaction area 602.

In another implementation consistent with the present disclosure, an operator defines perimeter 604 for an autonomous or semi-autonomous mode by informing control system 200 when compaction machine 100 is positioned at each of several corners of compaction area 602. As discussed above, control system 200 may initially record positional coordinates for the location of compaction machine 100 at a location 606 at the outset of a learning mode. Thereafter, compaction machine 100 is caused to move, by being driven from operator station 118 or through remote control, to a second position at a second corner of compaction area 602. For example, compaction machine 100 may be moved forward to the top right corner 610 of compaction area 602 as shown in FIG. 7. During this travel along the right side of perimeter 604, as discussed above, the operator visually inspects, whether by observing the terrain from operator station 118 or by observing images on display 500, that right buffer region 406 as defined by right maneuvering distance 402 and right indicator 428 are acceptably clear for travel by compaction machine 100 as may be needed. As shown in FIG. 7, compaction machine 100 is typically stopped at the furthermost point directly above its starting point on compaction area 602 so that the first drum 106 aligns with what is desired to be the top portion of perimeter 604. As well, the right edge of first drum 106 optimally is aligned with what is desired to be the right portion of perimeter 604.

When compaction machine 100 is at the upper right corner 610 of compaction area 602, the operator may visually inspect not only right buffer region 406, but also front buffer region 414 that now extends outside perimeter 604. In particular, operator may ensure that front buffer area 414 as defined by front maneuvering distance 412 and front indicator 432 is acceptably clear for travel by compaction machine 100 as needed.

At this second location, the operator may provide one or more commands or inputs to control system 200 via control interface 122 indicating that compaction machine 100 is at the second position at the upper right corner 610 of compaction area 602. At least at this time, location sensor 124 and/or other components of control system 200 determines positional coordinates of this second location from location sensor 124, as discussed above. Control system 200 may also record additional positional coordinates regarding the location and dimension of boundary 608. Based on right maneuvering distance 402 and the position and inspection of right indicator 428, the right side of boundary 608 may be continued from its initial recording when compaction machine 100 was located at the lower right corner 606 of compaction area 602. This continuation of the right side of boundary 608 is indicated by the vertical portion of dashed line 608 at the right side of FIG. 7. In addition, control system 200 may record initial locations for an upper portion of boundary 608, corresponding to front maneuvering distance 412 from perimeter 604 corresponding to the position of front indicator 432. The upper portion of boundary 608 is indicated by the horizontal portion of dashed line 608 at the top of FIG. 7. As with the right side of boundary 608, control system 200 may calculate a position for the upper side of boundary 608 by receiving the GPS coordinates of compaction machine 100 at the upper right corner 610 and adjusting the coordinates to account for front maneuvering distance 412. Alternatively, after calculating the position for the upper side of boundary 608, controller 130 could provide that position to a legacy software system as the position of the defined upper perimeter. The legacy software system would then subtract its upper safety zone from the position of boundary 608, leading to the same compaction area 602.

Following input from operator to control interface 122 at a second position, specifically upper right corner 610 in FIG. 7, compaction machine 100 may be relocated to another corner of compaction area 602, whether by being driven by operator within operator station 118 or through remote control. FIG. 8 illustrates compaction machine 100 at lower left corner 612 in compaction area 602. Alternatively, compaction machine 100 could be moved to upper left corner 614 of compaction area 602. When compaction machine 100 is at the lower left corner 612 of compaction area 602, the operator would visually inspect rear buffer region 418 as defined by rear maneuvering distance 416, as in FIG. 6, to ensure that the area is clear for compaction machine 100 to operate if needed. As discussed, rear buffer region 418 may be needed for compaction machine 100 to execute a turn and change directions to perform a pass along compaction area 602. Additionally, the operator would activate left indicator 430 if it had not previously been activated because left indicator 430 now extends outside perimeter 604. Operator would also visually inspect left buffer region 410 as defined by left maneuvering distance 408 and left indicator 430 to ensure clear and safe passage if required for compaction machine 100.

At this third location, the operator may provide one or more commands or inputs to control system 200 via control interface 122 indicating that compaction machine 100 is at the third position at the lower left corner 612 of compaction area 602. At least at this time, location sensor 124 and/or other components of control system 200 determines positional coordinates of this third location from location sensor 124, as discussed above. Control system 200 may also record additional positional coordinates regarding the location and dimension of boundary 608. Based on rear maneuvering distance 416 and the position and inspection of rear indicator 434, the lower side of boundary 608 may be continued from its initial recording when compaction machine 100 was located at the lower right corner 606 of compaction area 602. The operator may confirm, at least by visually projecting rear maneuvering distance 416 along the lower side of perimeter 604, that rear buffer region 418 is clear and safe for compaction machine 100 to maneuver as needed. This continuation of the lower side of boundary 608 is indicated by the horizontal portion of dashed line 608 at the bottom of FIG. 8. In addition, control system 200 may record initial locations for a left portion of boundary 608, corresponding to left maneuvering distance 408 from perimeter 604 corresponding to the position of left indicator 430. The left portion of boundary 608 is indicated by the vertical portion of dashed line 608 at the top of FIG. 8. As with the right side of boundary 608, control system 200 would calculate a position for the left side of boundary 608 by receiving the GPS coordinates of compaction machine 100 at the lower left corner 612 and adjusting the coordinates to account for left maneuvering distance 408. Alternatively, after calculating the position for the left side of boundary 608, controller 130 could provide that position to a legacy software system as the position of the defined left perimeter. The legacy software system may then subtract its left safety zone from the position of boundary 608, leading to the same compaction area 602.

Although not shown, compaction machine 100 may also be moved to upper left corner 614 of compaction area 602, or any other location for defining compaction area 602 with more precision, and recording positional coordinates. Following this sequence, controller 130 would be programmed with sufficient positional coordinates for control system 200 to define the location and dimensions of both perimeter 604 and boundary 608. For example, as when moving from lower right corner 606 to upper right corner 610 (FIGS. 6 to 7), compaction machine 100 is caused to move, by being driven from operator station 118 or through remote control, to a fourth position at the top left corner 614 of compaction area 602. During this travel along the left side of perimeter 604, the operator visually inspects, whether by observing the terrain from operator station 118 or by observing images on display 500, that left buffer region 410 as defined by left maneuvering distance 408 and left indicator 430 are acceptably clear for travel by compaction machine 100 as may be needed. When compaction machine 100 is at the upper left corner 614 of compaction area 602, the operator may visually inspect not only left buffer region 410, but also front buffer region 414 that now extends outside perimeter 604. Based on left maneuvering distance 408 and the position and inspection of left indicator 430, the left side of boundary 608 may be continued or confirmed from its initial recording when compaction machine 100 was located at the lower left corner 612 of compaction area 602. Similarly, the upper side of boundary 608 may be continued or confirmed based on clearance of front buffer region 414 as seen at upper left corner 614 combined with when at upper right corner 610.

Alternative to programming control unit 200 at specific points compaction area 602 to define perimeter 604, compaction machine 100 may be caused to travel in a continuous or near-continuous path to define entire perimeter 604 while the operator inspects the relevant buffer region for clearance. If traveling counterclockwise, compaction machine 100 could travel from lower right corner 606 to upper right corner 610 to upper left corner 614 to lower left corner 612 and back to lower right corner 606. In this example, the operator inspects right buffer region 406 for clearance around the entire perimeter 604. If traveling clockwise, the operator inspects the left buffer region 410 for clearance. Following this alternative, the operator would make adjustments for the appropriate size of the left or right maneuvering distance 402, 408 to account for the position of compaction machine 100 at the time based on the expected travel path of the machine during a subsequent work plan. For instance, if compaction machine 100 is traveling counterclockwise along the upper portion of compaction area 602 to define the upper portion of perimeter 604, the operator may adjust the position of right indicator 428 to be at a position equal to front maneuvering distance 412 in anticipation having the front of compaction machine 100 reaching that location when executing a work plan. Similarly, when traversing along the lower portion of compaction area 602 to define the lower portion of perimeter 604, the operator may adjust the position of right indicator 428 to be at a position equal to rear maneuvering distance 416. Other modifications will be apparent to those skilled in the art based on the particular drive pattern chosen when programming control unit 200 with perimeter 504 and geofence 608.

Additionally or alternatively, information indicative of the location of the perimeter 604 may be obtained from one or more professional surveys, topographical maps, and/or other prior analysis of the compaction area 602, and such information may be pre-loaded within a memory in communication with controller 130. In these examples, such information may be obtained from the memory and/or otherwise received by controller 130. Additionally, in such examples the operator may not be required to drive compaction machine 100 along the intended path of perimeter 604 to collect information for defining perimeter 604, although the pre-loaded information may be combined with the collected information from driving compaction machine 100 for added precision.

In accordance with various implementations of the present disclosure, control system 200 receives at 308 in FIG. 3, verification from the operator that the machine may operate outside perimeter 604 and within boundary 608. The operator would provide this verification, following visual inspection of the areas between sides of compaction machine 100 and the respective indicators, by providing a command or input to control interface 122. The operator typically makes this decision based on observation and judgment, preferably by observing ground zones between compaction machine 100 and one or more of indicators 428, 430, 432, and 434 from within compaction machine 100, either by looking directly at the ground area inside lights projected to represent maneuvering distances or by looking at images provided on display 500 as in FIG. 5. Operator could also observe the ground zones in other ways, such as while walking aside compaction machine 100 as it defines perimeter 604. The command or input may be provided at any time and for any segment of perimeter 604 or boundary 608. For instance, control interface 122 may enable the operator to provide verification by touching a location on a touchscreen just once after all relevant corners of compaction area 602 have been recorded. The touch input may indicate that the operator confirms that all areas between perimeter 604 and boundary 608 just defined are safe for operation of compaction machine 100 if required. Alternatively, control interface 122 may enable the operator to provide the confirmation input notifying control system 200 to record location data at each corner of compaction area 602.

Following verification from the operator, control system 200 at 310 defines a compaction area 602 as part of a work or compaction plan that includes at least a portion of perimeter 604. In some examples, controller 130 determines at least a portion of perimeter 604 from location of machine 100 at 306. In addition, although not detailed within this disclosure, control system 200 generates a compaction plan for compaction machine 100 associated with the worksite surface 102 and compaction area 602 based on information indicative of a location of perimeter 604, information indicative of one or more compaction requirements specific to the worksite surface 102, and/or any other received information. Controller 130 may determine the compaction plan, the travel path, the speed of compaction machine 100, a vibration frequency of first drum 106, a vibration amplitude of the first drum 106, and/or other operating parameters of compaction machine 100 using one or more compaction plan models, algorithms, neural networks, look-up tables, and/or through one or more additional methods. In an example, controller 130 may have an associated memory in which various compaction plan models, algorithms, look-up tables, and/or other components may be stored for determining the compaction plan, travel path, and/or operating parameters of compaction machine 100 based on one or more inputs. Controller 130 may receive other information indicative of, for example, one or more compaction requirements specific to the worksite surface 102, such as a number of passes associated with the worksite surface 102 and required in order to complete the compaction of the worksite surface 102, a desired stiffness, density, and/or compaction of the worksite surface 102, a desired level of efficiency for a corresponding compaction operation, a desired amount of overlap (one inch, two inches, six inches, one foot, etc.) between sequential passes of compaction machine 100, the stiffness, density, compactability, composition, moisture content (e.g., dryness/wetness), and/or other characteristics of the worksite surface 102, and/or any other received information. Such compaction requirements may be received from, for example, an operator of compaction machine 100, and may be received by controller 130 via, for example, the control interface 122 from one or more remote servers, processors, computing devices 204, electronic devices 208, and/or other components of control system 200.

An example compaction plan includes a travel path for compaction machine 100 that is substantially within perimeter 604 of the compaction area 602. Such a compaction plan may also include a speed of compaction machine 100, a vibration frequency of the first drum 106, a vibration amplitude of first drum 106, steering instructions for autonomous/semi-autonomous control of compaction machine 100, braking instructions for autonomous/semi-autonomous control of compaction machine 100, and/or other operating parameters of compaction machine 100.

As contemplated in the examples discussed in this disclosure, a simple and efficient travel path for compaction machine 100 in an autonomous or semi-autonomous mode according to a compaction plan typically encompasses forward and reverse traversals of compaction area 602 in parallel swaths. For example, compaction machine 100 may begin at lower right corner 606 of compaction area 602 and be programmed to travel along perimeter 604 to upper right corner 610. From upper right corner 610, compaction machine 100 travels in reverse back to lower right corner 606. Compaction machine 100 then crosses lower portion of perimeter 604 to execute a turn within rear buffer region 418 to continue forward in another vertical traversal in parallel and to the left of the first traversal. Compaction machine 100 may be programmed to repeat this travel path from bottom to top and from right to left on FIGS. 6-8 to treat all of compaction area 602.

In accordance with certain implementations of the present disclosure, as part of establishing a work plan or compaction plan for compaction area 602, method 300 of FIG. 3 at 312 includes control system 200 establishing a geofence for compaction machine 100. A "geofence" refers to a virtual boundary on a geographic area, i.e., a virtual boundary on a subsection of digital map, and may comprise at least two-dimensional coordinates defining the virtual boundary. A geofence may also be called an "electronic fence" or an "e-fence." While a geofence conventionally overlays or corresponds to a perimeter of a worksite, such as perimeter 604, control system 200 establishes a geofence for worksite 600 that substantially overlays or corresponds to boundary 608. An example geofence will be described below with respect to at least FIG. 9.

In establishing a geofence to substantially overlay boundary 608, control system 200 effectively sets an outer limit to the travel of compaction machine 100. Control system 200 has been programmed during learning mode to define perimeter 604 for compaction area 602 in which it is expected that machine will primarily operate. However, a safety zone around perimeter 604 substantially corresponds in width on respective sides to right maneuvering distance 402, front maneuvering distance 412, rear maneuvering distance 416, and left maneuvering distance 408. As needed, compaction machine 100 is permitted to move into these zones, but a geofence corresponding to boundary 608 serves to confine compaction machine 100. If compaction machine 100 were to move beyond to a position where location sensor 124 detects machine coordinates intersecting with coordinates of boundary 608, compaction machine 100 will be prevented from traveling farther. The prevention may occur by having control system 200 disable operation of compaction machine 100 under an autonomous or semi-autonomous mode so that an operator may take over in manual control. Alternatively, control system 200 may engage a steering or braking mechanism of compacting machine 100 to change course or stop movement of compaction machine 100. Other intercessions of compaction machine 100 by control system 200 based on an intersection with geofence at boundary 608 are within the choice of the skilled artisan. In these ways, the geofence at boundary 608 functions to protect the machine, personnel, or terrain from having compaction machine 100 pass beyond boundary 608.

As machine 100 undergoes the programming steps as represented in FIGS. 6-8, control system 200 processes the received data to define at least a portion of the perimeter of the worksite area for the work plan and to determine at least a portion of the geofence for the machine. Control system 200 also may represent to the operator through control interface 122 at least a graphical depiction of the work plan, including the defined perimeter and determined geofence, as shown in FIG. 9.

Figure 9:
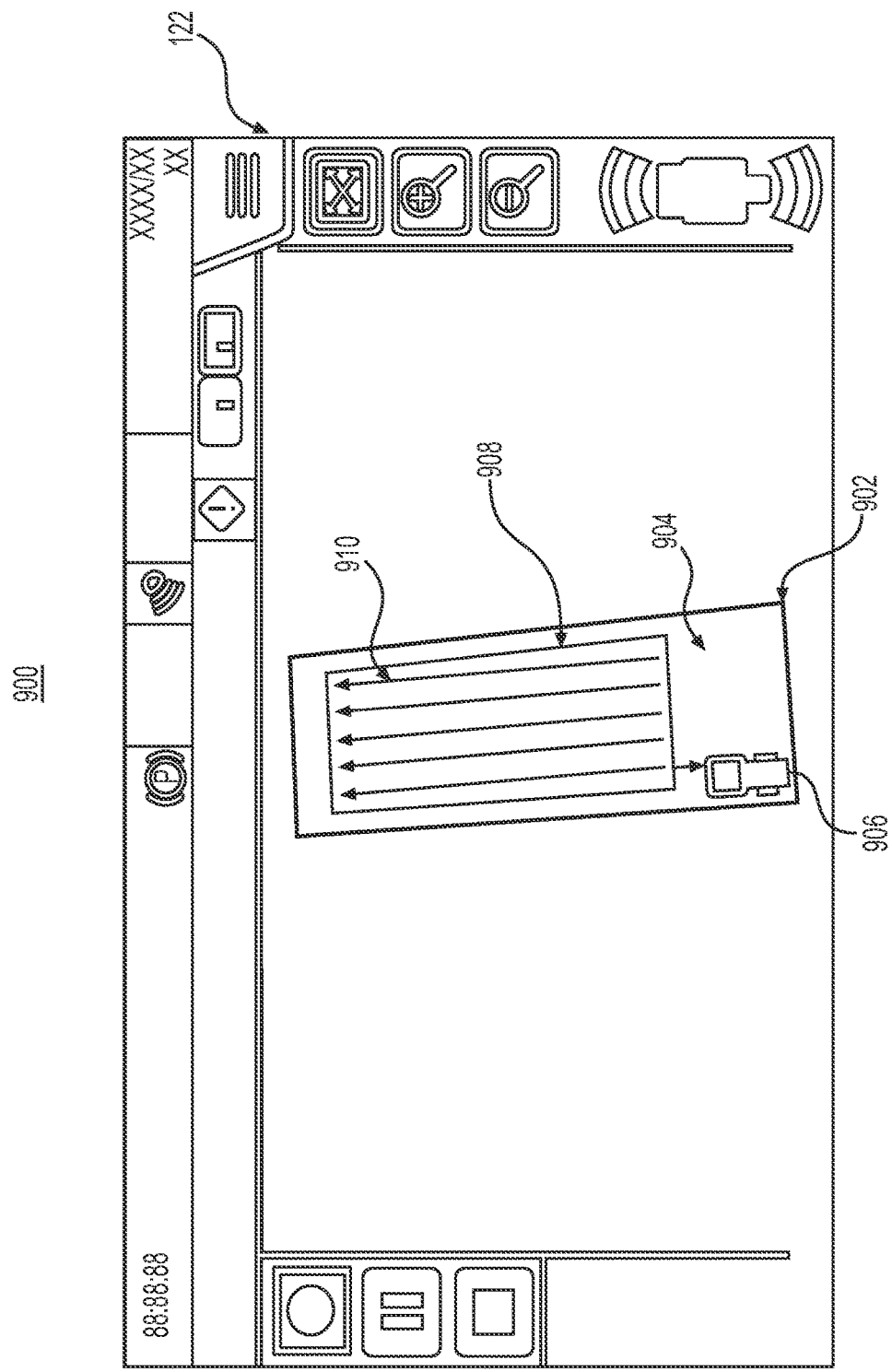
FIG. 9 is an example screenshot of a control interface displaying at least part of an example work plan with travel paths according to an example of the present disclosure.

FIG. 9 depicts an example screenshot of a user interface 900 within control interface 122 for the operator to interact with control system 200. As noted above, control interface 122 may comprise an analog, digital, and/or touchscreen display and may be configured to display a user interface such as 900 that includes at least part of a travel path and/or other components of a work plan. The user interface 900 may also include, for example, labels, location names, GPS coordinates of the respective locations, and/or other information associated with the work plan, and/or with operation of compaction machine 100. Information provided by user interface 900 is typically displayed and/or updated in real-time to assist the operator in controlling operation of compaction machine 100.

Exemplary user interface 900 depicts a stage of operation in which a travel path associated with a work plan has been determined and provided for consumption by the operator. Such a work plan within user interface 900 includes visual indicia indicating, among other things, perimeter 604, the travel path of compaction machine 100, a speed of compaction machine 100, a vibration frequency of the first drum 106, a vibration amplitude of the first drum 106, and/or other operating parameters of compaction machine 100. In such examples, visual indicia could also indicate one or more of the operating parameters.

In the example of FIG. 9, a work site for the pending project is displayed as defined by its geofence 902. As discussed above, geofence 902 will be the outermost border where compaction machine 100 can travel, either incidentally or purposefully, during execution of the work plan. Within geofence 902, user interface 900 depicts buffer area 904 in which compaction machine 100 may travel without compacting the ground surface. An icon 906 illustrates a current location of compaction machine 100 within the work site. A rectangular area depicting the compaction area 908 is also shown within the buffer area 904. This compaction area 908 is rimmed by perimeter 604 (not shown), which defines the outermost area in which a compaction operation is expected to be performed. As well, user interface 900 shows individual travel paths 910 for compaction machine 100 when executing the programmed work plan. In the example of FIG. 9, the travel paths 910 involve vertical straight paths that will be traversed by compaction machine 100. The straight paths will then be retraced in reverse by compaction machine 100, followed by an S-turn or a K-turn within the lower region of buffer area 904 from which an adjacent parallel path is traversed. Other information and controls provided through user interface 900 of control interface 122 will be readily apparent to those of ordinary skill in the art and do not detract from the principles of the present disclosure.

Although not detailed in FIG. 9, controller 130 may cause control interface 122 to display one or more messages intended for consumption by the operator of compaction machine 100. For example, controller 130 may cause control interface 122 to display a message requesting that the operator approve the travel path 910 displayed via the user interface 900 and/or that the operator approve various other portions of the compaction plan provided via the control interface 122. Controller 130 may also cause the control interface 122 to display one or more buttons, icons, and/or other data fields. Such data fields may comprise, for example, portions of the touch screen display, and/or other components of the control interface 122 configured to receive input (e.g., touch input) from the operator. It is understood that various other controls of compaction machine 100 may also be used to receive such inputs. In still further examples, the control interface and/or other components of compaction machine 100 may be configured to receive such inputs via voice recognition, gesture recognition, and/or other input methodologies. In various examples, controller 130 may also cause the control interface 122 to display one or more additional buttons, icons, and/or other controls operable to control various respective functions of compaction machine 100 and/or of the control interface 122.

INDUSTRIAL APPLICABILITY

The present disclosure provides systems and methods for defining a perimeter of a worksite to be compacted and a boundary outside the perimeter within which a compaction machine may maneuver. Such systems and methods may be used to align a compaction area with the perimeter defined by the operator. As a result, these systems and methods avoid a decrease in compaction area due to the automatic addition of a safety zone within the perimeter, while ensuring protection of personnel and equipment through the addition of an outer geofence boundary. As well, with the disclosed systems and methods, an operator can accurately define in advance the area of a worksite to be compacted, and additional steps of manually compacting areas automatically blocked for the safety zone in legacy systems can be avoided.

As noted above with respect to FIGS. 1-9, an example method 300 of defining a perimeter of a worksite to be compacted and a boundary outside the perimeter within which a compaction machine may maneuver includes receiving first information indicative of a first maneuvering distance from a side of a machine. Such a method 300 also includes activating an indicator, visible to an operator of a compaction machine 100, representative of the first maneuvering distance at the side of the machine. In some examples, such a method 300 further includes causing the machine to be positioned on a worksite area along a path to be traversed by the machine when executing a work plan, the indicator being positioned outside the worksite area. Further, a control system 200 as part of compaction machine 100, may receive a verification, based at least in part on the indicator, that the machine may operate outside the worksite area and within an outer boundary defined at least in part by the first maneuvering distance. As part of such a method 300, a controller 130 associated with a compaction machine 100 and part of control system 200 may define at least a portion of a perimeter of the worksite area for the work plan to include the path. Moreover, method 300 includes determining a geofence for the machine substantially overlaying the outer boundary.

By providing indicators or markers representative of buffer areas around compaction machine 100, the disclosed systems and methods enable the operator to have discretion over the safety of a land area beyond a defined perimeter. Therefore, rather than have a control system automatically, and possibly arbitrarily, dimension a safety zone, the operator may exercise judgment about the risks associated with operating compaction machine 100 within a safety zone and set the dimensions for that zone accordingly. As a result, valuable areas for compaction are not dedicated unnecessarily to a safety zone, and the operator may obtain a work plan consistent in size with the defined perimeter and the compaction area sought. Additionally, by defining an outer boundary as a geofence, the disclosed systems and methods ensure safe operation as a compaction machine may be disabled or otherwise controlled to prevent movement beyond the geofence. Finally, establishment of the perimeter for a compaction area and the geofence may occur simultaneously, providing speed and efficiency in programming control system 200 for executing a work plan in an autonomous or semi-autonomous mode.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A method, comprising:
receiving first information indicative of a first maneuvering distance from a side of a machine;
activating an indicator, visible to an operator of the machine, representative of the first maneuvering distance at the side of the machine, wherein activating the indicator comprises causing light to be illuminated onto ground at a position substantially equal to the first maneuvering distance from the machine;
causing the machine to be positioned on a worksite area along a path to be traversed by the machine when executing a work plan, the indicator being positioned outside the worksite area;
receiving a verification, based at least in part on the indicator, that the machine may operate outside the worksite area and within an outer boundary defined at least in part by the first maneuvering distance;
defining at least a portion of a perimeter of the worksite area for the work plan to include the path; and
determining at least a portion of a geofence for the machine substantially overlaying the outer boundary.

2. The method of claim 1, further comprising:
receiving second information indicative of one or more other maneuvering distances for respective other sides of the machine; and
activating one or more other indicators, visible to the operator of the machine, representative of the one or more other maneuvering distances at the respective other sides of the machine.

3. The method of claim 2, further comprising causing the machine to be positioned on the worksite area along another path to be traversed by the machine when executing the work plan, the one or more other indicators being positioned outside the worksite area.

4. The method of claim 3, further comprising receiving another verification, based at least on the one or more other indicators, that the machine may operate outside the worksite area and within the outer boundary as further defined at least in part by the one or more other maneuvering distances.

5. The method of claim 4, further comprising defining at least another portion of the perimeter of the worksite area for the work plan to include the another path.

6. The method of claim 1, wherein defining the path to be the perimeter comprises providing input to a legacy control module for generating the work plan, the input identifying the perimeter of the worksite area to be traversed by the machine as being substantially equal to the outer boundary.

7. The method of claim 1, wherein the verification comprises an operator input based at least in part on visual inspection of ground between the side of the machine and the outer boundary.

8. The method of claim 1, wherein activating the indicator comprises causing a marker to be superimposed on a camera display of ground at the side of the machine, the marker being arranged to represent a position substantially equal to the first maneuvering distance from the machine.

9. The method of claim 1, further comprising:
receiving coordinate data from a positioning system indicative of a location of the machine; and
based at least in part on the coordinate data, identifying the perimeter of the worksite surface for the work plan.

10. A control system, comprising:
a location sensor configured to determine a location of a compaction machine on a worksite surface;
a control interface connected to the compaction machine; and
a controller in communication with the location sensor and the control interface, the controller configured to:
cause one or more markers to be visually displayed indicating a boundary beyond one or more sides of the compaction machine while the compaction machine is positioned at an edge of a worksite area to be compacted, the causing one or more markers to be visually displayed comprises activating one or more demarcation lights configured to illuminate the one or more markers indicating the boundary on ground beyond the one or more sides of the compaction machine;
receive, from the location sensor, information regarding the location of the compaction machine;
receive, via the control interface, a verification that the compaction machine may maneuver outside the worksite area and within the boundary based on inspection of a ground zone between the one or more sides of the compaction machine and the one or more markers;
determine a perimeter of the worksite area for a work plan, the perimeter corresponding at least in part to the location of the compaction machine, the controller causing the one or more markers to be superimposed on an image of the ground zone displayed within the control interface, the image of the ground zone illustrating the one or more markers together with visual indicia of at least part of the perimeter; and generate a geofence for the work plan, the geofence substantially overlaying at the boundary.

11. The control system of claim 10, wherein the controller is further configured to display a compaction plan via the control interface, the compaction plan comprising the worksite area within the perimeter to be traversed by the compaction machine and the ground zone outside the perimeter in which the compaction machine may maneuver.

12. The control system of claim 10, wherein the controller is further configured to cause the one or more markers to be visually displayed indicating the boundary while the compaction machine travels along the edge of the worksite area to be compacted.

13. A compaction machine, comprising:

a substantially cylindrical drum configured to compact a worksite surface as the compaction machine traverses the worksite surface;

a location sensor configured to determine a location of the compaction machine on the worksite surface;

a control interface;

a controller in communication with the location sensor and the control interface, the controller configured to:

cause one or more markers to be visually displayed indicating a boundary beyond one or more sides of the compaction machine while the compaction machine travels along a perimeter of a polygonal area to be compacted;

receive, from the location sensor, information regarding locations of the compaction machine;

identify, based at least in part on the location of the compaction machine, the perimeter of the polygonal area;

receive, via the control interface, a verification that the compaction machine may maneuver outside the worksite surface and within the boundary based on inspection of a ground zone between the one or more sides of the compaction machine and the one or more markers, the controller causing the one or more markers to be superimposed on an image of the ground zone displayed within the control interface, the image of the ground zone illustrating the one or more markers together with visual indicia of at least part of the perimeter; and establish a geofence for the compaction machine comprising positional coordinates substantially coinciding with locations of the boundary; and one or more lights configured to illuminate the one or more markers indicating the boundary on ground beyond the one or more sides of the compaction machine.

14. The compaction machine of claim 13, further comprising a plurality of cameras configured to capture video images of the ground zone beyond the one or more sides of the compaction machine, wherein the image of the ground zone illustrating the one or more markers together with visual indicia comprises a video image, and the video image is displayed from the perspective of a camera of the plurality of cameras disposed on top of the compaction machine.

15. The compaction machine of claim 13, wherein the controller is further configured to display a compaction plan via the control interface, the compaction plan comprising the worksite surface within the perimeter to be traversed by the compaction machine and the ground zone outside the perimeter in which the compaction machine may maneuver.

16. The compaction machine of claim 13, wherein the controller is further configured to receive one or more distances for the boundary beyond the one or more sides of the compaction machine, the one or more distances being determined based at least in part on operational characteristics of the compaction machine.

* * * * *